(12) United States Patent
Li et al.

(10) Patent No.: US 10,798,708 B2
(45) Date of Patent: Oct. 6, 2020

(54) METHOD FOR DATA TRANSMISSION IN WIRELESS NETWORK, APPARATUS, AND SYSTEM

(71) Applicant: Huawei Technologies Co., Ltd., Shenzhen (CN)

(72) Inventors: Mingchao Li, Beijing (CN); Zhenzhen Cao, Beijing (CN); Xiao Xiao, Beijing (CN); Hang Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/401,751

(22) Filed: May 2, 2019

(65) Prior Publication Data

US 2019/0261376 A1 Aug. 22, 2019

Related U.S. Application Data

(63) Continuation of application No. PCT/CN2016/104757, filed on Nov. 4, 2016.

(51) Int. Cl.
*H04W 72/04* (2009.01)
*H04W 76/14* (2018.01)
(Continued)

(52) U.S. Cl.
CPC ..... *H04W 72/0473* (2013.01); *H04W 52/383* (2013.01); *H04W 76/14* (2018.02); *H04W 4/40* (2018.02); *H04W 52/281* (2013.01)

(58) Field of Classification Search
CPC .......... H04W 72/0473; H04W 76/14; H04W 52/383; H04W 52/281; H04W 4/40; H04W 52/367
See application file for complete search history.

(56) References Cited

U.S. PATENT DOCUMENTS

2013/0324182 A1 12/2013 Deng et al.
2016/0066356 A1 3/2016 Lindoff et al.
(Continued)

FOREIGN PATENT DOCUMENTS

CN 104469961 A 3/2015
CN 104683427 A 6/2015
(Continued)

OTHER PUBLICATIONS

Catt, Carrier configuration and carrier selection in eV2X CA, 3GPP TSG-RAN WG2 #99 R2-1708052, Berlin, Germany, Aug. 21-25, 2017 (Year: 2017).*

(Continued)

*Primary Examiner* — Mounir Moutaouakil

(74) *Attorney, Agent, or Firm* — Leydig, Voit & Mayer, Ltd.

(57) ABSTRACT

A data transmission in a wireless network is described. The data transmission includes: determining, by a terminal device, a first configuration information. If the terminal device determines that a type-1 data and a type-2 data need to be transmitted at a same time, the terminal device allocates a first transmit power for first data based on the first configuration information. In this case, a transmission performance of a system in a high-density service scenario is improved, while a transmission quality of important data is ensured.

10 Claims, 5 Drawing Sheets

(51) Int. Cl.
*H04W 52/38* (2009.01)
*H04W 4/40* (2018.01)
*H04W 52/28* (2009.01)

(56) References Cited

U.S. PATENT DOCUMENTS

| | | | |
|---|---|---|---|
| 2016/0174142 | A1 | 6/2016 | Kitagawa et al. |
| 2017/0171837 | A1 | 6/2017 | Chen et al. |
| 2018/0146478 | A1* | 5/2018 | Kim .................. H04W 4/06 |
| 2018/0176871 | A1 | 6/2018 | Li et al. |
| 2018/0184442 | A1 | 6/2018 | Bai et al. |
| 2018/0324718 | A1* | 11/2018 | Serrano .............. H04W 76/10 |
| 2019/0045345 | A1* | 2/2019 | Lee .................. H04W 72/0453 |
| 2019/0075546 | A1* | 3/2019 | Yasukawa .......... H04W 72/02 |
| 2019/0357025 | A1* | 11/2019 | Hwang ............... H04L 5/001 |
| 2020/0077434 | A1* | 3/2020 | Kim .................. H04W 72/1278 |
| 2020/0163005 | A1* | 5/2020 | Rao .................. H04W 76/11 |

FOREIGN PATENT DOCUMENTS

| | | |
|---|---|---|
| CN | 104811892 A | 7/2015 |
| CN | 104936297 A | 9/2015 |

OTHER PUBLICATIONS

Catt, Considerations on PC5 Carrier Aggregation, 3GPP TSG-RAN WG2 Meeting #99 R2-1708055, Berlin, Germany, Aug. 21-25, 2017 (Year: 2017).*

Oppo, Discussion on Service and Carrier Mapping for PC5 CA in eV2X, 3GPP TSG-RAN WG2#99 R2-1708039, Berlin, Germany, Aug. 22-26, 2017 (Year: 2017).*

"Support of QoS for PC5-based V2V transport," 3GPP TSG-RAN WG2 Meeting #94, Nanjing, China, R2-163811, pp. 1-6, 3rd Generation Partnership Project, Valbonne, France (May 23-27, 2016).

"Traffic management in V2X," 3GPP TSG-RAN WG2 #92, Anaheim, USA, R2-156635, p. 1-3, 3rd Generation Partnership Project, Valbonne, France (Nov. 16-20, 2015).

"Congestion Control for PC5-based V2X," 3GPP TSG-RAN WG2 Meeting #95-bis, Kaohsiung, R2-166296, pp. 1-3, 3rd Generation Partnership Project, Valbonne, France (Oct. 10-14, 2016).

* cited by examiner

US 10,798,708 B2

METHOD FOR DATA TRANSMISSION IN WIRELESS NETWORK, APPARATUS, AND SYSTEM

CROSS-REFERENCE TO RELATED APPLICATIONS

This application is a continuation of International Application No. PCT/CN2016/104757, filed on Nov. 4, 2016, the disclosure of which is hereby incorporated by reference in its entirety.

TECHNICAL FIELD

The present invention relates to wireless communications technologies, and in particular, to a method for data transmission in a wireless network, an apparatus, and a system.

BACKGROUND

V2X is a wireless communications technology for data transmission and information exchange between a vehicle and everything. V2X communication includes vehicle to vehicle (V2V) communication, vehicle to infrastructure (V2I) communication, vehicle to pedestrian (V2P) communication, and the like. A vehicle may obtain rich information and services in time by performing V2X communication. This greatly improves intelligence of a transport system. A network used for V2X communication is referred to as the Internet of Vehicles.

An LTE system may be used to carry various services in the Internet of Vehicles. In the LTE system, a vehicle terminal device and another terminal device exchange V2X service data by using a V2X message. A transmission resource needs to be used when V2X service data is transmitted between terminal devices. A terminal device may use a transmission resource dynamically allocated by a network device, or may autonomously select a transmission resource from a transmission resource pool preconfigured by a network device. In the autonomous selection manner, a plurality of neighboring terminal devices may select a same transmission resource, that is, a transmission collision occurs. As a quantity of terminal devices or service density increases, a transmission collision rate also increases correspondingly. In addition to V2X service data, the terminal device further needs to transmit service data of another type, for example, voice service data. To ensure transmission coverage of service data of various types, the terminal device needs to allocate appropriate transmit powers for service data of different types. However, there is an upper limit for a total transmit power configured by the system for the terminal device. Therefore, service data of a plurality of types that is simultaneously transmitted contends for an available transmit power. Consequently, a total transmit power does not satisfy a requirement, and further, some data cannot be transmitted to a specified receiving target device. In a high-density service scenario, insufficiency of transmission resources and transmit powers of the system has severe impact on transmission performance of the system.

SUMMARY

Illustrative examples of a method for data transmission in a wireless network, an apparatus, and a system are described herein that ensure efficient communication between terminal devices in a high-density service scenario, reduce impact of transmission resource insufficiency or transmit power insufficiency on system performance, and improve work performance of a system.

According to one aspect, an illustrative embodiment provides a method for data transmission in a wireless network, where the method includes: determining, by a terminal device, first configuration information, where the first configuration information is used to determine at least one first sidelink logical channel, and the first sidelink logical channel is used to transmit direct communication data; and if the terminal device determines that type-1 data and type-2 data need to be transmitted at a same time, allocating, by the terminal device, a first transmit power for first data based on the first configuration information, where the type-1 data and the type-2 data are data to be transmitted by using different transmission resources, and the first data is the type-1 data to be transmitted by using the first sidelink logical channel. In the method provided by this embodiment, if data of different types needs to be transmitted at a same time, a transmit power is allocated for data of one type more preferentially than to data of another type. This ensures efficient communication of important data, reduces impact of transmit power insufficiency on system performance, and improves work performance of a system.

In a possible design, the determining, by the terminal device, that type-1 data and type-2 data need to be transmitted at a same time includes: determining, by the terminal device, that a transmission resource used for the type-1 data and a transmission resource used for the type-2 data partly or completely overlap each other in time domain; or determining, by the terminal device, that a subframe for transmitting the type-1 data and a subframe for transmitting the type-2 data partly or completely overlap each other in time domain.

In a possible design, the allocating, by the terminal device, a first transmit power for first data based on the first configuration information includes: allocating, by the terminal device, the first transmit power for the first data based on a first limited power, where the first transmit power is higher than the first limited power and lower than or equal to a maximum transmit power currently allowed by the terminal device.

In a possible design, the allocating, by the terminal device, a first transmit power for first data based on the first configuration information includes: allocating, by the terminal device, the first transmit power for the first data based on a first limited power, where the first transmit power is lower than or equal to the first limited power.

In a possible design, the first limited power is carried in the first configuration information or carried in a second message, or the first limited power is preconfigured by the terminal device.

In a possible design, if the terminal device determines that the type-1 data and the type-2 data are not to be transmitted at the same time, the method further includes: determining, by the terminal device, a second transmit power for the type-1 data based on the currently allowed maximum transmit power, where the currently allowed maximum transmit power is preconfigured by the terminal device or determined by the terminal device based on configuration information transmitted by a network device; and transmitting, by the terminal device, the type-1 data by using the second transmit power.

In a possible design, if the terminal device determines that the type-1 data and the type-2 data are not to be transmitted at the same time, the method further includes: determining, by the terminal device, a second transmit power based on a current link loss between the terminal device and a network device; and transmitting, by the terminal device, the type-1 data by using the second transmit power.

In a possible design, the method further includes: determining, by the terminal device, at least one second sidelink logical channel based on the first configuration information, where the second sidelink logical channel is used to transmit direct communication data; if the terminal device determines that the type-1 data and the type-2 data need to be transmitted at the same time, allocating, by the terminal device, a third transmit power for the type-2 data; allocating, by the terminal device, a fourth transmit power for second data based on the allowed maximum transmit power and the third transmit power, where the second data is the type-1 data to be transmitted by using the second sidelink logical channel; and transmitting, by the terminal device, the second data by using the fourth transmit power.

In a possible design, the terminal device determines the first configuration information based on a received Radio Resource Control message or broadcast message transmitted by the network device; or the terminal device determines the first configuration information based on a preconfiguration.

According to another aspect, an illustrative embodiment provides a method for data transmission in a wireless network, where the method includes: determining, by a terminal device, first configuration information, where the first configuration information is used to determine at least one first sidelink logical channel, and the first sidelink logical channel is used to transmit direct communication data; determining, by the terminal device, to start a transmission control operation; and performing, by the terminal device, the transmission control operation on first data, where the first data is data that is in to-be-transmitted data and that is to be transmitted by using the first sidelink logical channel, and the transmission control operation includes: transmitting, by the terminal device, the first data in a first transmission mode. In the method provided by this embodiment, if a transmission collision exists in a system, the transmission control operation may be performed on data on the first sidelink logical channel. This ensures efficient communication of important data, reduces impact of transmit resource insufficiency on system performance, and improves work performance of the system.

In a possible design, the determining, by the terminal device, to start a transmission control operation includes: receiving, by the terminal device, first information transmitted by a network device, where the first information is used to instruct the terminal device to start the transmission control operation; or when determining the first configuration information, determining, by the terminal device, to start the transmission control operation.

In a possible design, the determining, by the terminal device, to start a transmission control operation includes: measuring, by the terminal device, a channel busy rate, where the channel busy rate is used to indicate a load degree of a transmission channel; and when the channel busy rate is greater than a preset threshold, determining, by the terminal device, to start the transmission control operation.

In a possible design, the transmitting, by the terminal device, the first data in a first transmission mode includes: determining, by the terminal device, a first transmission configuration, where the first transmission configuration includes at least one of a first modulation and coding scheme, a first transmit power, and a first quantity of retransmission times; the terminal device determines the first transmission configuration based on a received Radio Resource Control message or broadcast message transmitted by the network device; and/or the terminal device determines the first transmission configuration based on a preconfiguration.

In a possible design, the terminal device encapsulates the first data in a first protocol data unit; and the terminal device transmits the first protocol data unit based on the first transmission configuration.

In a possible design, the transmitting, by the terminal device, the first data in a first transmission mode includes: dropping, by the terminal device, the first data at a Packet Data Convergence Protocol layer or a Media Access layer. Specifically, the terminal device determines a drop probability of the first sidelink logical channel; and the terminal device drops the first data based on the drop probability.

In a possible design, before the determining, by the terminal device, to start a transmission control operation, the method further includes: transmitting, by the terminal device, the first data on the first sidelink logical channel in a second transmission mode, where the second transmission mode includes transmitting the first data based on a second transmission configuration, and the second transmission configuration includes at least one of a second modulation and coding scheme, a second transmit power, and a second quantity of retransmission times.

In a possible design, the method further includes: determining, by the terminal device, a second sidelink logical channel based on the first configuration information; determining, by the terminal device, a third transmission configuration; and transmitting, by the terminal device, second data on the second sidelink logical channel by using the third transmission configuration, where the third transmission configuration includes at least one of a third modulation and coding scheme, a third transmit power, and a third quantity of retransmission times.

In a possible design, the terminal device determines the first configuration information based on a received Radio Resource Control message or broadcast message transmitted by the network device; or the terminal device determines the first configuration information based on a preconfiguration.

In a possible design, before the performing, by the terminal device, the transmission control operation on first data on the first sidelink logical channel, the method further includes: obtaining, by the terminal device, first transmission mode control information, where the first transmission mode control information is used to instruct the terminal device to transmit the first data in the first transmission mode, and the first transmission mode includes at least one of using the first transmission configuration, dropping data packets, or preferentially allocating a power.

In a possible design, the first transmission mode control information includes at least one first identifier and the first transmission mode associated with the first identifier; the first identifier is used to determine the first sidelink logical channel; and the first transmission mode is used to transmit the first data.

According to still another aspect, an illustrative embodiment provides a method for data transmission in a wireless network, where the method includes: determining, by a network device, first configuration information, where the first configuration information is used to determine at least one first sidelink logical channel, and the first sidelink logical channel supports a transmission control operation; and transmitting, by the network device, the first configuration information to a terminal device by using Radio Resource Control message or a broadcast message. In the method provided by this embodiment, the network device may configure a logical channel supporting the transmission control operation for the terminal device, and therefore transmission performance of a system in a high-density service scenario is ensured.

In a possible design, the method further includes: receiving, by the network device, a channel busy rate, where the channel busy rate is used to indicate a load degree of a transmission channel; and transmitting, by the network device, first information to the terminal device, where the first information is used to instruct the terminal device to start a transmission control operation.

In a possible design, the method further includes: transmitting, by the network device, first transmission mode control information to the terminal device, where the first transmission mode control information is used to instruct the terminal device to transmit first data on the first sidelink logical channel in a first transmission mode, and the first transmission mode includes at least one of using a first transmission configuration, and/or dropping data packets, and preferentially allocating a power.

In a possible design, the network device transmits a first limited power to the terminal device by using the first configuration information or a second message, where the first limited power is used by the terminal device to determine a transmit power for transmitting data on the first sidelink logical channel.

For the foregoing aspects, embodiments further include the following possible designs.

In a possible design, the first configuration information includes at least one first identifier, the first identifier is a priority identifier or a logical channel identifier, and the first identifier is used to determine the first sidelink logical channel.

In a possible design, that the first identifier is used to determine the first sidelink logical channel includes: the terminal device determines a sidelink logical channel having the first identifier, as the first sidelink logical channel; or the terminal device determines a sidelink logical channel not having the first identifier, as the first sidelink logical channel; or when at least one of sidelink logical channels associated with data encapsulated in a protocol data unit of the terminal device has the first identifier, the terminal device determines all the sidelink logical channels associated with the data encapsulated in the protocol data unit, as the first sidelink logical channels.

In a possible design, the first configuration information further includes at least one second identifier, the second identifier is a priority identifier or a logical channel identifier, and the second identifier is used to determine the second sidelink logical channel.

In a possible design, the first configuration information includes first indication information, and the first indication information is used to indicate that some or all sidelink logical channels are the first sidelink logical channels.

According to still another aspect, an embodiment provides a terminal device, where the terminal device performs the method for data transmission in a wireless network in the foregoing aspect, and the terminal device includes a processing unit, configured to determine first configuration information, where the first configuration information is used to determine at least one first sidelink logical channel, and the first sidelink logical channel is used to transmit direct communication data; where if the processing unit determines that type-1 data and type-2 data need to be transmitted at a same time, the processing unit is further configured to allocate a first transmit power for first data based on the first configuration information, where the type-1 data and the type-2 data are data to be transmitted by using different transmission resources, and the first data is the type-1 data to be transmitted by using the first sidelink logical channel.

In a possible design, that the processing unit determines that type-1 data and type-2 data need to be transmitted at a same time includes: the processing unit determines that a transmission resource used for the type-1 data and a transmission resource used for the type-2 data partly or completely overlap each other in time domain; or the processing unit determines that a subframe for transmitting the type-1 data and a subframe for transmitting the type-2 data partly or completely overlap each other in time domain.

In a possible design, that the processing unit is further configured to allocate a first transmit power for first data based on the first configuration information includes: the processing unit allocates the first transmit power for the first data based on a first limited power, where the first transmit power is higher than the first limited power and lower than or equal to a maximum transmit power currently allowed by the terminal device.

In a possible design, that the processing unit is further configured to allocate a first transmit power for first data based on the first configuration information includes: the processing unit allocates the first transmit power for the first data based on a first limited power, where the first transmit power is lower than or equal to the first limited power.

In a possible design, if the processing unit determines that the type-1 data and the type-2 data are not to be transmitted at the same time, the terminal device further includes: the processing unit is further configured to determine a second transmit power for the type-1 data based on the currently allowed maximum transmit power, where the currently allowed maximum transmit power is preconfigured by the processing unit or determined by the processing unit based on configuration information transmitted by a network device; and a transmission unit, configured to transmit the type-1 data by using the second transmit power.

In a possible design, if the processing unit determines that the type-1 data and the type-2 data are not to be transmitted at the same time, the terminal device further includes: the processing unit determines a second transmit power based on a current link loss between the terminal device and a network device; and the processing unit transmits the type-1 data by using the second transmit power.

In a possible design, the processing unit is further configured to determine at least one second sidelink logical channel based on the first configuration information, where the second sidelink logical channel is used to transmit direct communication data; the processing unit allocates a third transmit power for the type-2 data; the processing unit allocates a fourth transmit power for second data based on the allowed maximum transmit power and the third transmit power, where the second data is the type-1 data to be transmitted by using the second sidelink logical channel; and the transmission unit is further configured to transmit the second data by using the fourth transmit power.

In a possible design, that the processing unit is configured to determine first configuration information includes: the processing unit determines the first configuration information based on a Radio Resource Control message or a broadcast message transmitted by the network device; or the processing unit determines the first configuration information based on a preconfiguration.

According to still another aspect, an embodiment provides a terminal device, where the terminal device performs the method for data transmission in a wireless network in the foregoing aspect, and the terminal device includes a processing unit and a transmission unit, where the processing unit is configured to determine first configuration information, where the first configuration information is used to determine at least one first sidelink logical channel; the processing unit is further configured to determine to start a transmission control operation; and the processing unit is further configured to perform the transmission control operation on first data on the first sidelink logical channel, where the first sidelink logical channel is determined based on the first configuration information, and the transmission control operation includes: controlling, by the processing unit, the transmission unit to transmit the first data in a first transmission mode.

In a possible design, the terminal device determines the first sidelink logical channel based on the first configuration information by using the method in the foregoing aspect, and the terminal device may determine the first sidelink logical channel based on a first identifier or first indication information.

In a possible design, the terminal device further includes a receiving unit, where that the processing unit is further configured to determine to start a transmission control operation includes: the processing unit is further configured to determine, based on first information transmitted by a network device and received by the receiving unit, to start the transmission control operation; or when determining the first configuration information, the processing unit is further configured to determine to start the transmission control operation; or the processing unit is further configured to measure a channel busy rate, where the channel busy rate is used to indicate a load degree of a transmission channel; and when the channel busy rate is greater than a preset threshold, the processing unit is further configured to start the transmission control operation.

In a possible design, the processing unit is further configured to determine a first transmission configuration, where the first transmission configuration includes at least one of a first modulation and coding scheme, a first transmit power, and a first quantity of retransmission times; the processing unit determines the first transmission configuration based on a Radio Resource Control message or a broadcast message transmitted by the network device and received by the receiving unit; and/or the processing unit is further configured to determine the first transmission configuration based on a preconfiguration; the processing unit is further configured to encapsulate the first data in a first protocol data unit; and the transmission unit is further configured to transmit the first protocol data unit by using the first transmission configuration.

In a possible design, before the processing unit determines to start the transmission control operation, the terminal device further includes: the transmission unit is further configured to transmit the first data on the first sidelink logical channel in a second transmission mode, where the second transmission mode includes transmitting the first data based on a second transmission configuration, and the second transmission configuration includes at least one of a second modulation and coding scheme, a second transmit power, and a second quantity of retransmission times.

In a possible design, the processing unit is further configured to control the transmission unit to drop the first data at a Packet Data Convergence Protocol layer or a Media Access layer; the processing unit is further configured to determine a drop probability of the first sidelink logical channel; and the processing unit is further configured to control the transmission unit to drop the first data based on the drop probability.

In a possible design, before the processing unit performs the transmission control operation on the first data on the first sidelink logical channel, the terminal device further includes: the receiving unit is configured to obtain first transmission mode control information, where the first transmission mode control information is used to instruct the transmission unit to transmit the first data in the first transmission mode, and the first transmission mode includes using the first transmission configuration and/or dropping data packets.

In a possible design, the processing unit is further configured to determine a second sidelink logical channel based on the first configuration information; and the transmission unit is further configured to transmit second data on the second sidelink logical channel in the second transmission mode, where the second transmission mode includes transmitting the second data based on a third transmission configuration, and the third transmission configuration includes at least one of a third modulation and coding scheme, a third transmit power, and a third quantity of retransmission times.

In a possible design, that the processing unit is configured to determine first configuration information includes: the processing unit determines the first configuration information based on a Radio Resource Control message or a broadcast message transmitted by the network device and received by the receiving unit; or the processing unit determines the first configuration information based on a preconfiguration.

In a possible design, the terminal device may implement functions of the terminal device in the foregoing method by using hardware. A structure of the terminal device may include a receiver, a transmitter, and a processor, where the receiver and the transmitter may implement functions of the receiving unit and the transmission unit, and the processor may implement functions of the processing unit.

In a possible design, the terminal device may also implement functions of the terminal device in the foregoing method by executing corresponding software by hardware. The hardware or software includes one or more modules corresponding to the foregoing functions. The module may be software and/or hardware.

According to still another aspect, an embodiment provides a network device, where the network device performs the method for data transmission in a wireless network in the foregoing aspect, and the network device includes a processing unit, configured to determine first configuration information, where the first configuration information is used to determine at least one first sidelink logical channel, and the first sidelink logical channel supports a transmission control operation; and a transmission unit, configured to transmit the first configuration information to a terminal device by using Radio Resource Control message or a broadcast message.

In a possible design, the network device further includes a receiving unit, where the receiving unit is configured to receive a channel busy rate, where the channel busy rate is used to indicate a load degree of a transmission channel; and the transmission unit is further configured to transmit first information to the terminal device, where the first information is used to instruct the terminal device to start a transmission control operation.

In a possible design, the transmission unit is further configured to transmit first transmission mode control information to the terminal device, where the first transmission mode control information is used to instruct the terminal device to transmit first data on the first sidelink logical channel in the first transmission mode, and the first transmission mode includes at least one of using a first transmission configuration, dropping data packets, and preferentially allocating a power.

In a possible design, the network device may implement functions of the network device in the foregoing method by using hardware. A structure of the network device may include a processor, a receiver, and a transmitter. The processor may implement functions of the processing unit. The receiver and the transmitter may implement functions of the receiving unit and the transmission unit, and are configured to support communication between the network device and the terminal device, transmit information or an instruction used in the foregoing method to the terminal device, and receive information transmitted by the terminal device. The network device may further include a memory. The memory is configured to be coupled with the processor. The memory stores a program instruction and data required by the network device.

In a possible design, the network device may also implement functions of the network device in the foregoing method by executing corresponding software by hardware. The hardware or software includes one or more modules corresponding to the foregoing functions. The module may be software and/or hardware.

According to still another aspect, an embodiment provides a communications system, where the communications system includes the network device and the terminal device in the foregoing aspects.

According to yet another aspect, an embodiment provides a computer storage medium, configured to store a computer software instruction used by the foregoing terminal device, where the computer software instruction includes a program designed for executing the method in the foregoing aspect.

According to yet another aspect, an embodiment provides a computer storage medium, configured to store a computer software instruction used by the foregoing network device, where the computer software instruction includes a program designed for executing the foregoing aspect.

According to the technical solutions provided by the embodiments, the terminal device performs the transmission control operation on data on the first sidelink logical channel in a high-density service scenario. This ensures efficient communication between terminal devices, reduces impact of transmission resource insufficiency or transmit power insufficiency on system performance, and improves work performance of the system.

BRIEF DESCRIPTION OF DRAWINGS

To describe the technical solutions in the embodiments more clearly, the following briefly describes the accompanying drawings required for describing the embodiments. The accompanying drawings in the following description merely show some embodiments, and a person of ordinary skill in the art can derive other drawings from these accompanying drawings within an appropriate range.

DESCRIPTION OF EMBODIMENTS

The technical solutions in the embodiments are clearly described in the following with reference to the accompanying drawings. The described embodiments are merely some but not all of the embodiments. It may be understood that, all other embodiments that a person of ordinary skill in the art obtains by combining technical features in the embodiments or between the embodiments shall also fall within the protection scope of the present disclosure, provided that no ambiguity or contradiction is generated.

Figure 1:
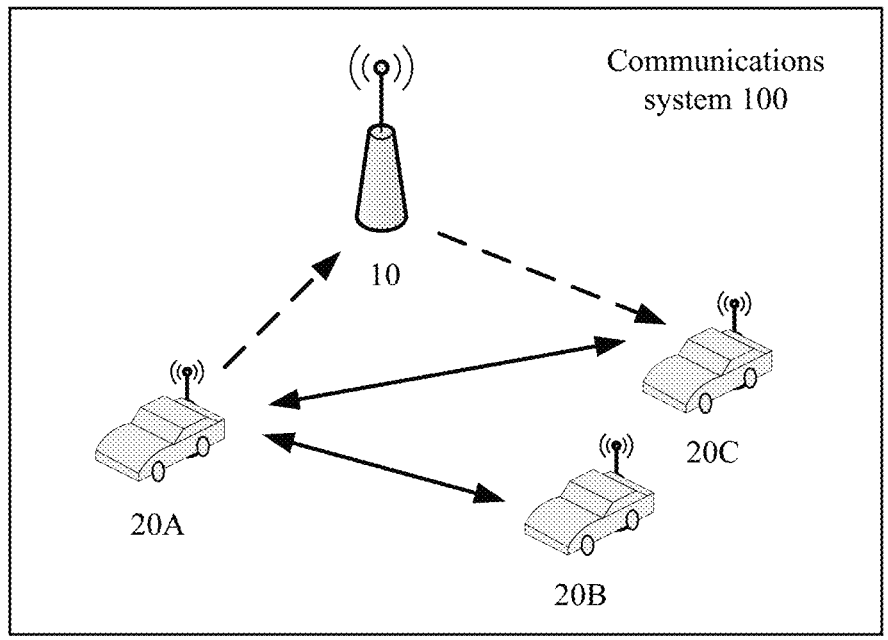
FIG. 1 is a schematic diagram of a communications system according to an embodiment.

The solutions provided by the embodiments are based on a communications system 100 shown in FIG. 1. The communications system 100 supports V2X communication and other service communication (for example, a voice service). The communications system 100 includes at least one network device (for example, a base station (BS)) and a plurality of terminal devices (for example, vehicle terminal devices). The network device may provide data transmission services for the plurality of terminal devices. The plurality of terminal devices may exchange data by using V2X messages. Using V2V communication as an example, a vehicle terminal device may share, in real time by using a V2V message, information about the vehicle terminal device, such as a vehicle speed, a driving direction, a specific location, and whether to perform emergency braking or not. Other vehicle terminal devices may learn a current traffic condition by obtaining the shared information, to predetermine and avoid a possible danger. The plurality of terminal devices may further transmit data of other service types to each other, to implement diversified data exchange services.

The terminal devices may transmit data (for example, a V2X message) to each other by using the network device. The terminal device first transmits to-be-transmitted data to the network device, and then the network device transmits the data to another terminal device (for example, as shown by dashed-line arrows in FIG. 1). The terminal devices may also transmit data to each other in a direct communication mode (for example, as shown by solid-line arrows in FIG. 1). In the direct communication mode, the terminal devices directly transmit data to each other by using resources allocated by the network device.

The terminal device needs to use a transmission resource when transmitting data in the direct communication mode. The transmission resource may be a time-frequency resource. The transmission resource may be dynamically allocated by the network device. For example, the network device allocates an appropriate transmission resource to the terminal device based on an amount of the data to be transmitted by the terminal device. The network device may also configure a transmission resource pool for the terminal device in advance. When the terminal device is located outside a service area covered by the network device, the network device may also configure a transmission resource pool in a preconfiguration mode. The transmission resource pool is shared by the plurality of terminal devices. The terminal device may autonomously select a transmission resource from the transmission resource pool when the terminal device has a data transmission requirement.

The terminal device may transmit service data of different types, for example, V2X service data and non-V2X service data. In this case, the terminal device needs to allocate transmit powers for data of various types, to ensure maximally efficient transmission.

Specifically, as shown in FIG. 1, the communications system 100 includes a network device 10 and a plurality of terminal devices. The plurality of terminal devices may be identified as terminal devices 20A to 20C respectively. Data may be transmitted between the terminal devices 20A to 20C by using the network device 10, or data may be transmitted between the terminal devices 20A to 20C in a direct communication mode. The network device 10 may dynamically allocate transmission resources to the terminal devices 20A to 20C, or may preconfigure a transmission resource pool for the terminal devices 20A to 20C.

In the embodiments, the communications system 100 may be a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD), a Universal Mobile Telecommunications System (UMTS), or another wireless communications system using an orthogonal frequency division multiplexing (OFDM) technology. System architectures and service scenarios described in the embodiments are intended to describe the technical solutions of the embodiments more clearly, and do not constitute any limitation to the technical solutions provided by the embodiments. A person of ordinary skill in the art may know that, with evolution of a network architecture and emergence of a new service scenario, the technical solutions provided by the embodiments are also applicable to similar technical problems.

In the embodiments, the network device (for example, the network device 10) may be configured to provide a wireless communication function for the terminal device. The network device may include a macro base station, a micro base station (also referred to as a small cell), a relay station, an access point, and the like in various forms. The network device may be a base transceiver station (BTS) in GSM or CDMA system, or may be a NodeB (NB) in WCDMA, or may be an evolved NodeB (eNB, or e-NodeB) in LTE system, or may be a corresponding next generation NodeB (gNB) in a 5G network. For ease of description, in all the embodiments, the foregoing apparatuses that provide a wireless communication function for the terminal device are referred to as a network device.

In the embodiments, the terminal device (for example, the terminal devices 20A to 20C) may also be referred to as user equipment (UE), a mobile station (MS), a mobile terminal (Mobile Terminal), or the like. The terminal device may communicate with one or more core networks by using a radio access network (RAN). For example, the terminal device may be a mobile phone (or referred to as a "cellular" phone), or a computer having a mobile terminal. For example, the terminal device may alternatively be a portable, pocket-sized, handheld, computer built-in, or in-vehicle mobile apparatus, which exchanges voice and/or data with the network. This is not specifically limited in the embodiments.

It should be noted that, a quantity of network elements included in the communications system 100 shown in FIG. 1 is merely an example, and the embodiments are not limited thereto. In addition, in the communications system 100 shown in FIG. 1, although the network device 10 and the terminal devices 20A to 20C are shown, the communications systems 100 may not be limited to including the foregoing network elements, the communications systems 100 may further include, for example, a device configured to bear a virtualized network function. Details are not described herein.

As described above, when the terminal device has a data transmission requirement, the terminal device may autonomously select a transmission resource from a transmission resource pool configured in advance or preconfigured by the network device. In this case, because transmission resources are limited, a plurality of neighboring terminal devices may select a same transmission resource, that is, a transmission collision occurs. Consequently, a transmission channel is busy. Generally, when a quantity of terminal devices is not large, or a data transmission requirement is not high, impact of the busy transmission channel on system performance is relatively low. However, as the quantity of terminal devices or the data transmission requirement increases, a transmission collision rate also increases correspondingly. Due to a higher transmission collision rate, some data on the transmission channel may not be transmitted normally.

When the terminal device needs to transmit service data of different types simultaneously, appropriate transmit powers need to be allocated for the service data of different types. In this case, because there is an upper limit for a total transmit power configured by the system for the terminal device, when service data of a plurality of types that is simultaneously transmitted needs to contend for a limited transmit power. As more service data of different types needs to be transmitted at a same time, some data cannot be efficiently transmitted due to transmit power insufficiency.

In a high-density service scenario, both the foregoing two cases cause the system performance to deteriorate significantly.

In view of the foregoing technical problem, in a method for data transmission in a wireless network according to an embodiment, in a high-density service scenario, a transmission control operation is performed on first data on a first sidelink logical channel, to ensure reliable transmission of important data and improve work performance of a system. Certainly, in actual work, regardless of a high-density service scenario, the method for data transmission in a wireless network according to this embodiment may be used to improve transmission performance of the system while ensuring data transmission reliability.

Figure 2:
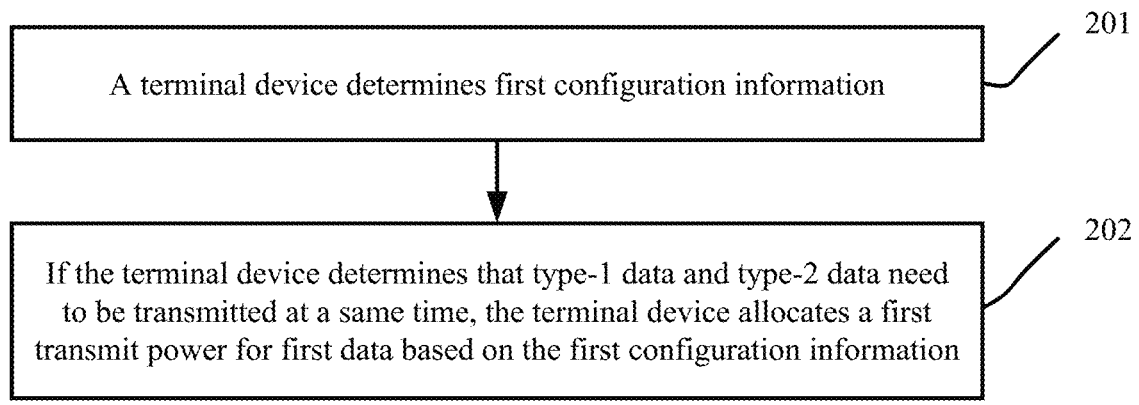
FIG. 2 is a flowchart of a method for data transmission in a wireless network according to an embodiment.

FIG. 2 is a flowchart of a method for data transmission in a wireless network according to an embodiment. In this embodiment, a terminal device may transmit service data of different types at a same time, for example, V2X service data and non-V2X service data. The method provided by this embodiment is described in detail below with reference to FIG. 2.

S201. A terminal device determines first configuration information.

The first configuration information is used to determine at least one first sidelink logical channel. The first sidelink logical channel is used to transmit direct communication data. The first configuration information may be further used to determine a second sidelink logical channel. The second sidelink logical channel may also be used to transmit direct communication data. For example, both the first sidelink logical channel and the second sidelink logical channel may be used to transmit the V2X service data.

Optionally, the first configuration information includes at least one first identifier. The first identifier is used to determine the first sidelink logical channel. For example, the first configuration information includes a first identifier list. Alternatively, the first configuration information includes one first identifier alone. The first identifier may correspond to at least one sidelink logical channel. The first identifier may be a logical channel identifier. The first identifier may alternatively be a priority identifier, for example, a PPPP (ProSe Per-Packet Priority) identifier or a quality of service class identifier (QCI). Each sidelink logical channel corresponds to one priority identifier. The priority identifier is used to indicate a transmission requirement or feature of data on the sidelink logical channel, for example, a priority of the data, a transmission latency requirement of the data, or a reference transmit power of the data.

Optionally, the first configuration information includes at least one second identifier. Similar to a case in which the first configuration information includes the first identifier, the first configuration information may include a second identifier list or one second identifier alone. The second identifier may correspond to at least one sidelink logical channel. The second identifier may be an identifier of a sidelink logical channel, or may be a priority identifier, for example, a PPPP identifier or a QCI.

It may be understood that, the first configuration information may further include both the first identifier and the second identifier.

The first configuration information may include first indication information. The first indication information is used to indicate that some or all sidelink logical channels are the first sidelink logical channels.

The terminal device may determine the first configuration information based on a received Radio Resource Control (RRC) message transmitted by a network device. For example, the network device may add the first configuration information to an RRC reconfiguration message or another RRC dedicated message and transmit the RRC reconfiguration message or the another RRC dedicated message to the terminal device. The terminal device may alternatively determine the first configuration information based on a received broadcast message transmitted by the network device.

The terminal device may alternatively determine the first configuration information based on a preconfiguration. For example, the terminal device generates the first configuration information by using prestored configuration information of the sidelink logical channel or historical information of the sidelink logical channel. The first configuration information may include at least one field. The terminal device may alternatively determine the first configuration information based on descriptions about a predefined protocol standard procedure. The first configuration information may be one or more parameters in the descriptions about the procedure. A manner of determining the first configuration information by the terminal device is not specifically limited in this embodiment.

It may be understood that, the terminal device determines the first sidelink logical channel based on the first configuration information.

Optionally, the terminal device determines the first sidelink logical channel based on the first identifier. For example, the terminal device determines a sidelink logical channel having the first identifier, as the first sidelink logical channel; or the terminal device determines a sidelink logical channel not having the first identifier, as the first sidelink logical channel. Remaining sidelink logical channels may be second sidelink logical channels.

The terminal device may determine a sidelink logical channel corresponding to an identifier value greater than or equal to the first identifier, as the first sidelink logical channel. Alternatively, the terminal device may determine a sidelink logical channel corresponding to an identifier value less than or equal to the first identifier, as the first sidelink logical channel. Remaining sidelink logical channels may be second sidelink logical channels.

When at least one sidelink logical channel associated with data encapsulated in a Media Access Control (MAC) protocol data unit (PDU) of the terminal device has the first identifier, the terminal device may determine all sidelink logical channels associated with the data encapsulated in the MAC PDU, as the first sidelink logical channels. For example, when a sidelink logical channel having a highest priority and associated with the data encapsulated in the MAC PDU of the terminal device has the first identifier, the terminal device determines all sidelink logical channels associated with the data encapsulated in the MAC PDU, as the first sidelink logical channels.

Optionally, the terminal device determines the first sidelink logical channel based on the second identifier. For example, the terminal device determines a sidelink logical channel having the second identifier, as the second sidelink logical channel; or the terminal device determines a sidelink logical channel not having the second identifier, as the second sidelink logical channel. Remaining sidelink logical channels may be the first sidelink logical channels. For another example, the terminal device determines a sidelink logical channel corresponding to an identifier value greater than or equal to the second identifier, as the second sidelink logical channel. Alternatively, the terminal device determines a sidelink logical channel corresponding to an identifier value less than or equal to the second identifier, as the second sidelink logical channel. Remaining sidelink logical channels may be the first sidelink logical channels.

The terminal device may alternatively determine the first sidelink logical channel based on the first identifier and the second identifier. For example, the terminal device determines a sidelink logical channel having the first identifier, as the first sidelink logical channel, and determines a sidelink logical channel having the second identifier, as the second sidelink logical channel.

Optionally, the terminal device determines a third identifier of the non-V2X service data to be transmitted. The third identifier may be included in the first configuration information, or may be independent of the first configuration information. The third identifier may be transmitted by the network device to the terminal device. The terminal device may also determine the third identifier based on a preconfiguration. The third identifier and the first identifier may be identifiers of a same type. The terminal device compares a priority or an importance of the third identifier with that of the first identifier. The terminal device determines the first identifier whose priority or importance is higher than that of the third identifier, and determines a sidelink logical channel corresponding to the first identifier, as the first sidelink logical channel. An order of the third identifier and the first identifier for comparison may be obtained through network configuration, preconfiguration by the terminal device, or another manner. This is not specifically limited in this embodiment.

It may be understood that, in this embodiment, there may be an upper limit for a maximum transmit power currently allowed by the terminal device. In this case, the first identifier may be used to indicate a priority or importance of the V2X service data. The terminal device may determine a sidelink logical channel for transmitting the V2X service data of higher importance, as the first sidelink logical channel, and preferentially allocate an appropriate transmit power. For the non-V2X service data of lower importance, allocation is performed based on a remaining transmit power. Likewise, the terminal device may determine a sidelink logical channel for transmitting the V2X service data of lower importance, as the second sidelink logical channel, and does not preferentially allocate a transmit power.

The terminal device may alternatively determine the first sidelink logical channel based on the first indication information. For example, the terminal device determines all sidelink logical channels as the first sidelink logical channels based on the first indication information.

S202. If the terminal device determines that type-1 data and type-2 data need to be transmitted at a same time, the terminal device allocates a first transmit power for first data based on the first configuration information.

The type-1 data and the type-2 data are data to be transmitted by using different transmission resources. The type-1 data and the type-2 data may be transmitted on different carrier frequencies. The type-1 data may be the V2X service data, and the type-2 data may be the non-V2X service data. The first data is the type-1 data to be transmitted on the first sidelink logical channel. For example, the first data is the V2X service data to be transmitted on the first sidelink logical channel.

Optionally, the same time may indicate that a transmission resource used by the terminal device to transmit the V2X service data and a transmission resource used by the terminal device to transmit the non-V2X service data partly or completely overlap each other in time domain. Alternatively, the same time may indicate that a subframe used by the terminal device to transmit the V2X service data and a subframe used by the terminal device to transmit the non-V2X service data partly or completely overlap each other in time domain.

Optionally, when the terminal device determines that the V2X service data and the non-V2X service data are to be transmitted at the same time, the terminal device allocates the first transmit power for the first data. For example, the terminal device needs to determine grant information of the transmission resource for transmitting the V2X service data and grant information of the transmission resource for transmitting the non-V2X service data. In two time-frequency resources indicated by the two types of grant information, when a part or all of one time-frequency resource and a part or all of the other time-frequency resource are in a same subframe, the terminal device determines that the V2X service data and the non-V2X service data are to be transmitted at the same time.

The terminal device may alternatively allocate the first transmit power for the first data after the terminal device determines that the V2X service data and the non-V2X service data are to be transmitted at the same time. The time may be a subframe. For example, the terminal device allocates the first transmit power for the first data at a time at which the data is actually transmitted. Alternatively, after the terminal device determines that the V2X service data and the non-V2X service data are to be transmitted at the same time, the terminal device allocates the first transmit power for the first data at a time of k milliseconds before an actual transmission time, where k is a real number that is greater than 0. The terminal device may determine a value of k based on a preconfiguration. For example, k is a preset fixed value. The terminal device may alternatively determine the value of k based on an actual transmission condition. For example, the terminal device may determine different values of k based on sizes of different data packets.

Optionally, the terminal device receives first information transmitted by the network device, and determines, based on the first information, to start to allocate the first transmit power for the first data. Optionally, the first information is independent of the first configuration information. The first information may alternatively be included in the first configuration information. Alternatively, the first information includes the first configuration information. The network device may determine, based on a data transmission requirement reported by the terminal device, to transmit the first information. For example, if the terminal device reports to the network device that the terminal device needs to transmit the V2X service data and the non-V2X service data simultaneously, the network device transmits the first information.

Optionally, the terminal device preferentially allocates the first transmit power for the first data. Specifically, the method includes:

S20211. The terminal device preferentially allocates the first transmit power for the first data.

The terminal device may determine the first transmit power based on a first limited power. The first limited power is used to indicate a selection range of the first transmit power.

In a possible implementation, the first limited power has a mapping relationship with the first identifier, and is used to indicate a maximum available transmit power for data on a sidelink logical channel indicated by the first identifier. For example, each first identifier corresponds to one first limited power, and is used to determine a first limited power of each first sidelink logical channel. For another example, a plurality of first identifiers correspond to one first limited power. Alternatively, all first identifiers correspond to one first limited power. To be specific, all first sidelink logical channels identified by the first identifiers have a same first limited power. The terminal device allocates the first transmit power for the first data based on the first limited power. If $P_{limit\ 1}$ indicates the first limited power, and $P_1$ indicates the first transmit power, the selection range of the first transmit power is $0 < P_1 \leq P_{limit\ 1}$.

The first limited power and the mapping relationship between the first limited power and the first identifier may also be independent of the first configuration information. The terminal device may determine the first limited power and the mapping relationship between the first limited power and the first identifier based on a received second message (for example, an RRC message or a broadcast message) transmitted by the network device or based on a preconfiguration.

In another possible implementation, the terminal device preferentially allocates the first transmit power for the first data based on the first limited power. The first transmit power may be higher than the first limited power and lower than or equal to the maximum transmit power currently allowed by the terminal device. The terminal device may determine the first limited power $P_{limit\ 1}$ by using the method and the mapping relationship in the foregoing implementation. The first limited power is used to indicate a maximum available transmit power for data on the sidelink logical channel indicated by the first identifier. The terminal device further determines a second limited power $P_{limit\ 2}$ based on the maximum transmit power $P_{max}$ currently allowed to be used and a theoretical transmit power $P_{theoretical}$ for the non-V2X service data. The maximum transmit power is an upper limit for a transmit power that may be used by the terminal device for transmitting all service data. $P_{limit\ 2}=P_{max}-P_{theoretical}$. The terminal device determines the higher one of the first limited power and the second limited power, as a third limited power, that is, $P_{limit\ 3}=\max(P_{limit\ 1}, P_{limit\ 2})$. The terminal device determines, based on the third limited power $P_{limit\ 3}$, that the selection range of the first transmit power is $0<P_1 \leq P_{limit\ 3}$. For example, the maximum transmit power $P_{max}$ currently allowed to be used by the terminal device is 23 dbm. The maximum available transmit power for transmitting the first data by the terminal device, that is, the first limited power, is set to 15 dbm. The theoretical transmit power $P_{theoretical}$ for the non-V2X service data is set to 2 dbm. In this case, the second limited power $P_{limit\ 2}$ is 23 dbm−2 dbm=21 dbm. Therefore, the terminal device determines the higher one of $P_{limit\ 1}$=15 dbm and $P_{limit\ 2}$=21 dbm as the third limited power $P_{limit\ 3}$, that is, $P_{limit\ 3}$ is 21 dbm. The terminal device determines that the selection range of the first transmit power is $0<P_1 \leq 21$ dbm.

S20212. The terminal device encapsulates the first data in a first protocol data unit.

Specifically, the terminal device encapsulates the first data on different first sidelink logical channels in the same first PDU. For example, the terminal device encapsulates the first data on different first sidelink logical channels in a same MAC PDU. Then a MAC layer transmits the MAC PDU to a physical layer for transmission.

S20213. The terminal device transmits the first protocol data unit by using the first transmit power.

The terminal device may first obtain first grant (Grant) information of a sidelink transmission resource before transmitting the first PDU. The terminal device may receive the first grant information transmitted by the network device. The terminal device may alternatively determine the first grant information based on preconfiguration information or in an autonomous selection manner. The terminal device determines an available transmission resource based on the first grant information. The transmission resource can only be used to transmit the first data on the first sidelink logical channel.

It may be understood that, a time sequence relationship between step S20211 and step S20212 is not particularly limited in this embodiment.

Optionally, the terminal device encapsulates the non-V2X service data in a second PDU. The second PDU may be a MAC PDU. The terminal device determines, based on the maximum transmit power $P_{max}$ currently allowed to be used and the first transmit power $P_1$, a transmit power P used for transmitting the second PDU. $0<P \leq (P_{max}-P_1)$.

It should be noted that, if the terminal device determines that the V2X service data and the non-V2X service data do not need to be transmitted at the same time, the terminal device transmits the type-1 data by using a second transmit power.

Optionally, the terminal device determines the second transmit power within a range of the maximum transmit power $P_{max}$ currently allowed to be used. The terminal device may determine, based on a preconfiguration or based on received configuration information transmitted by the network device, the maximum transmit power $P_{max}$ currently allowed to be used. Therefore, the terminal device determines that a selection range of the second transmit power is $0<P_2 \leq P_{max}$.

Optionally, the terminal device receives power control indication information transmitted by the network device, where the power control indication information is used to instruct the terminal device to determine, when determining that the V2X service data and the non-V2X service data do not need to be transmitted at the same time, the second transmit power by using an existing power control mechanism. The existing power control mechanism may be determining the second transmit power based on a transmission link loss between the terminal device and the network device.

The terminal device may alternatively determine the second transmit power based on a preconfiguration or based on received configuration information transmitted by the network device.

Therefore, when the terminal device needs to transmit the V2X service data and the non-V2X service data at the same time, if the priority or importance of the V2X service data is higher than that of the non-V2X service data, the terminal device preferentially allocates an appropriate transmit power for the V2X service data. Therefore, the terminal device can ensure transmission quality of the V2X service data of the higher priority or importance.

It may be understood that, the terminal device does not preferentially allocate a transmit power for second data on the second sidelink logical channel. The second data is the type-1 data to be transmitted on the second sidelink logical channel. For example, the second data is the V2X service data to be transmitted on the second sidelink logical channel.

Optionally, the terminal device encapsulates the second data in a third PDU. The third PDU may be a MAC PDU. When the terminal device determines that the second data and the non-V2X service data need to be transmitted at a same time, the terminal device preferentially allocates a third transmit power for the non-V2X service data. The third transmit power may be determined based on the transmission requirement of the non-V2X service data and the theoretical transmit power. This is not specifically limited in this embodiment. The terminal device determines a fourth transmit power based on the maximum transmit power currently allowed to be used and the third transmit power. If $P_{max}$ indicates the maximum transmit power and $P_3$ indicates the third transmit power, a selection range of the fourth transmit power is $0<P_4 \leq (P_{max}-P_3)$. The terminal device transmits the third PDU by using the fourth transmit power.

Optionally, when the terminal device determines that the V2X service data and the non-V2X service data need to be transmitted at different times, the terminal device determines appropriate transmit powers for the V2X service data and the non-V2X service data respectively within the range of the maximum transmit power currently allowed to be used. The terminal device may determine, based on a preconfiguration or based on received configuration information transmitted by the network device, the maximum transmit power $P_{max}$ currently allowed to be used. This is not specifically limited in this embodiment.

In the method for data transmission according to this embodiment, the terminal device may preferentially allocate a transmit power for the type-1 data (for example, data of a higher priority or importance) on the first sidelink logical channel. Therefore, transmission quality of important data is effectively ensured, and transmission performance of a system in a high-density service scenario is improved.

Figure 3:
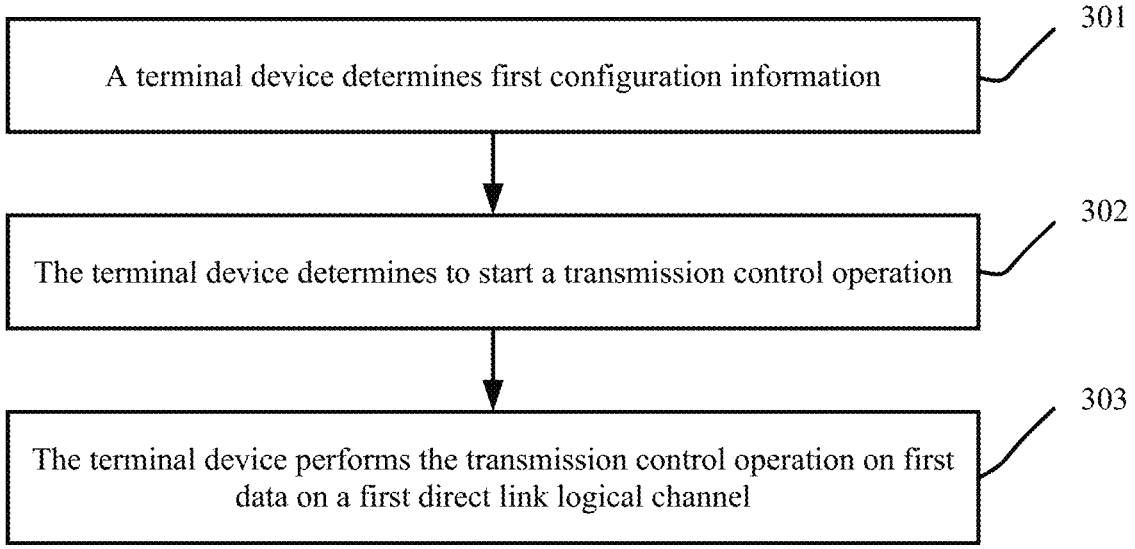
FIG. 3 is a flowchart of a method for data transmission in a wireless network according to another embodiment.

FIG. 3 is a flowchart of a method for data transmission in a wireless network according to another embodiment. In this embodiment, a transmission collision may exist when a terminal device transmits data. The method provided by this embodiment is described in detail below with reference to FIG. 3.

S301. A terminal device determines first configuration information.

The first configuration information is used to determine a first sidelink logical channel. The first sidelink logical channel supports a transmission control operation. The first configuration information may be further used to determine a second sidelink logical channel. The second sidelink logical channel does not support the transmission control operation. The first sidelink logical channel and the second sidelink logical channel are both used to transmit direct communication data.

The transmission control operation may also be referred to as a congestion control operation, a busy control operation, a high load control operation, or the like. A form and a name of the transmission control operation are not specifically limited in this embodiment. The transmission control operation is a control operation used by the terminal device when load of a transmission channel is relatively heavy (that is, the transmission channel is busy).

Optionally, the first configuration information includes at least one first identifier. The first identifier may correspond to the sidelink logical channel in a mapping manner same as that used in step S201 in the embodiment shown in FIG. 2. The first identifier may be a logical channel identifier. The first identifier may alternatively be a priority identifier, for example, a PPPP identifier. Each sidelink logical channel corresponds to one priority identifier. The priority identifier is used to indicate a transmission requirement or feature of data on the sidelink logical channel, for example, a priority of the data, a transmission latency requirement of the data, or a reference transmit power of the data.

Optionally, the first configuration information includes at least one second identifier. The second identifier may be a logical channel identifier, or may be a priority identifier (for example, a PPPP identifier). The first configuration information may alternatively include both the first identifier and the second identifier. The first configuration information may further include first indication information. Specific forms of the first configuration information and the second identifier and methods for determining the first configuration information and the second identifier are the same as those described in step S201 in the embodiment shown in FIG. 2, and details are not described herein again.

S302. The terminal device determines to start a transmission control operation.

Optionally, the terminal device measures a channel busy rate (CBR). The CBR is used to indicate a load degree of a current transmission channel. When the CBR is greater than a preset threshold, the terminal device determines to start the transmission control operation. For example, if the preset threshold is 0.6, when the CBR measured by the terminal device is higher than 0.6, the terminal device determines to start the transmission control operation. The terminal device may obtain the preset threshold in a preconfiguration mode. The preset threshold may alternatively be configured and transmitted to the terminal device by a network device. A manner of obtaining the preset threshold is not specifically limited in this embodiment.

The terminal device may further receive second information transmitted by the network device, and determine, based on the second information, to start the transmission control operation. The network device may determine, based on the load degree of the current transmission channel, to transmit the second information. For example, the network device receives a CBR reported by the terminal device or another terminal device. When the CBR is greater than the preset threshold, the network device transmits the second information. Optionally, the second information is independent of the first configuration information. The second information may alternatively be included in the first configuration information. Alternatively, the second information includes the first configuration information.

When determining the first configuration information, the terminal device may further directly determine to start the transmission control operation.

S303. The terminal device performs the transmission control operation on first data on the first sidelink logical channel.

The first sidelink logical channel is determined based on the first configuration information. The transmission control operation includes: transmitting, by the terminal device, the first data in a first transmission mode. The first transmission mode is a transmission mode used by the terminal device when the load of the transmission channel is relatively heavy (that is, the transmission channel is busy).

The terminal device may determine the first sidelink logical channel based on the first identifier, as described in step S201 in the embodiment shown in FIG. 2. As described in step S202, the terminal device may determine a sidelink logical channel having or not having the first identifier, as the first sidelink logical channel. Alternatively, when at least one sidelink logical channel associated with data encapsulated in a MAC PDU of the terminal device has the first identifier, the terminal device determines all sidelink logical channels associated with the data encapsulated in the MAC PDU, as the first sidelink logical channels. The terminal device may also determine the second sidelink logical channel based on the second identifier, and further determine the first sidelink logical channel. A method for determining the second sidelink logical channel is the same as the method, described in step S202 in the embodiment shown in FIG. 2, for determining the second sidelink logical channel by using the second identifier. The terminal device may further determine the first sidelink logical channel based on the first identifier and the second identifier. The terminal device may alternatively determine the first sidelink logical channel based on the first indication information.

It may be understood that, if the load of the transmission channel is relatively heavy in this embodiment, when the first identifier is a priority identifier, the terminal device may determine a sidelink logical channel of a lower transmission priority as the first sidelink logical channel, and determine a sidelink logical channel of a higher transmission priority as the second sidelink logical channel. The terminal device may allocate data of lower importance to the first sidelink logical channel, and allocate data of higher importance to the second sidelink logical channel. Therefore, the terminal device performs the transmission control operation only on unimportant data, so as to ensure transmission reliability of important data.

It may be understood that, a time sequence relationship between step S302 and this step of determining the sidelink logical channel is not particularly limited in this embodiment.

Optionally, before performing the transmission control operation, the terminal device obtains first transmission mode control information.

The first transmission mode control information is used to instruct the terminal device to transmit the first data in the first transmission mode. The first transmission mode includes using a first transmission configuration to transmit the first data, or dropping data packets, or using a first transmission configuration and dropping data packets.

It may be understood that, the terminal device may receive the first transmission mode control information from the network device. The terminal device may alternatively determine the first transmission mode control information by itself, so as to determine to use the first transmission configuration or drop data packets.

Optionally, the first transmission mode control information is included in the first configuration information. The first transmission mode is associated with the first identifier. For example, each first identifier corresponds to one first transmission mode, and is used to determine a transmission mode used for each first sidelink logical channel. For another example, a plurality of first identifiers correspond to one first transmission mode. Alternatively, all first identifiers correspond to one first transmission mode. To be specific, all first sidelink logical channels identified by the first identifiers use a same transmission mode.

The first transmission mode control information may alternatively be independent information. The first transmission mode control information includes the first identifier, and the first transmission mode associated with the first identifier. One first transmission mode may correspond to one or more first identifiers. Particularly, one first transmission mode may correspond to all first identifiers. To be specific, all first sidelink logical channels identified by the first identifiers use a same transmission mode. The terminal device may determine the first transmission mode control information based on an RRC dedicated message or broadcast message transmitted by the network device. The terminal device may alternatively determine the first transmission mode control information based on a preconfiguration.

In a possible implementation, the terminal device performs the transmission control operation by controlling a transmission configuration of the first data. The first transmission mode specifically includes:

S30311. The terminal device determines a first transmission configuration.

The first transmission configuration is determined based on the load degree of the transmission channel. The first transmission configuration includes at least one of a first modulation and coding scheme (MCS), a first transmit power, and a first quantity of retransmission times.

Optionally, the terminal device determines the first transmission configuration based on the measured CBR. The terminal device may determine different first transmission configurations based on different CBR measurement results. For example, the terminal device starts the transmission control operation when the CBR is higher than 0.6. When 0.6<CBR<0.8, the terminal device transmits a first PDU by using a transmission configuration A. When CBR>0.8, the terminal device transmits the first PDU by using a transmission configuration B. If a value of the CBR is higher, it indicates that the load of the transmission channel is heavier. Therefore, a preferred configuration mode is: when the CBR is higher, a value of the first MCS, the first transmit power, or the first quantity of retransmission times in the first transmission configuration is smaller. To be specific, when the load of the transmission channel is heavier, the terminal device transmits the first data by using a lower rate, a lower power, or a smaller quantity of retransmission times. The terminal device may prestore a mapping relationship between the CBR and the first transmission configuration. The terminal device may also determine the mapping relationship based on a preconfiguration. The terminal device may alternatively obtain the mapping relationship based on a received control message or broadcast message transmitted by the network device. This is not specifically limited in this embodiment.

Optionally, the terminal device determines the first transmission configuration based on a probability. For example, every time the first PDU is transmitted, the terminal device randomly generates a numeric value between 0 and 1. When the numeric value is less than 0.5, the terminal device uses the transmission configuration A; otherwise, the terminal device uses the transmission configuration B. The terminal device may determine a plurality of transmission configurations and trigger probabilities corresponding to the plurality of transmission configurations. The transmission configurations and the corresponding trigger probabilities may be obtained based on a preconfiguration or a protocol standard, or may be obtained based on received RRC dedicated signaling or system information transmitted by the network device. This is not specifically limited in this embodiment.

S30312. The terminal device encapsulates the first data in a first PDU.

Specifically, the terminal device encapsulates the first data on different first sidelink logical channels in the same first PDU. For example, the terminal device encapsulates the first data on different first sidelink logical channels in a same MAC PDU. Then a MAC layer transmits the MAC PDU to a physical layer for transmission.

S30313. The terminal device transmits the first PDU by using the first transmission configuration.

The terminal device may first obtain first grant (Grant) information of a sidelink transmission resource before transmitting the first PDU. The terminal device may receive the first grant information transmitted by the network device. The terminal device may alternatively determine the first grant information based on preconfiguration information or in an autonomous selection manner. The terminal device determines an available transmission resource based on the first grant information. The transmission resource can only be used to transmit the first data on the first sidelink logical channel.

It may be understood that, a time sequence relationship between step S30311 and step S30312 is not particularly limited in this embodiment.

In this implementation, when the load of the transmission channel is relatively heavy, the terminal device may suppress data transmission on the first sidelink logical channel to improve transmission performance of a system.

In another possible implementation, the terminal device performs the transmission control operation by dropping the first data. The first transmission mode specifically includes:

S30321. The terminal device determines a drop probability of the first sidelink logical channel.

Optionally, the drop probability may be included in the first configuration information. For example, each first identifier corresponds to one drop probability, that is, each first identifier is mapped to a unique drop probability. Therefore, each first sidelink logical channel corresponds to one drop probability. Alternatively, a plurality of first identifiers correspond to one drop probability. Alternatively, the first configuration information includes a drop probability, and the drop probability is applicable to all the first sidelink logical channels.

The drop probability and the first configuration information may alternatively be obtained separately. The terminal device may determine the drop probability based on an RRC message or broadcast message transmitted by the network device. The terminal device may alternatively determine the drop probability based on a preconfiguration.

Optionally, when a load degree of a transmission channel varies, a drop probability of a same first sidelink logical channel varies. For example, when 0.6<CBR<0.8, the drop probability of the first sidelink logical channel is 20%. When CBR>0.8, the drop probability of the first sidelink logical channel is 50%. It may be understood that, generally, if the load degree of the transmission channel is higher, the drop probability is higher.

S30322. The terminal device drops the first data based on the drop probability.

Specifically, the terminal device drops the first data at a Packet Data Convergence Protocol (PDCP) layer, a MAC layer, or a Radio Link Control (RLC) layer. For example, the terminal device determines that the drop probability of the first sidelink logical channel is 20%. When the PDCP layer, the MAC layer, or the RLC layer receives a new service data unit (SDU), the terminal device randomly generates a numeric value between 0 and 1. When the numeric value is less than 0.2, the terminal device performs a dropping operation.

In this implementation, when the load of the transmission channel is relatively heavy, the terminal device may drop some data on the first sidelink logical channel to improve transmission performance of the system.

It should be noted that, before the terminal device determines to start the transmission control operation, the terminal device transmits the first data on the first sidelink logical channel in a second transmission mode. The second transmission mode is a transmission mode used when the terminal device transmits data normally. Specifically, the terminal device transmits the first data based on a second transmission configuration. The second transmission configuration includes at least one of a second modulation and coding scheme, a second transmit power, and a second quantity of retransmission times. The second transmission configuration may be determined based on a transmission requirement of the first data.

Optionally, the terminal device obtains second transmission mode control information before transmitting the first data in the second transmission mode. The second transmission mode control information is used to instruct the terminal device to transmit the first data in the second transmission mode.

Similar to the first transmission mode control information, the second transmission mode control information may be included in the first configuration information. The second transmission mode may correspond to one or more first identifiers. Particularly, the second transmission mode may correspond to all the first identifiers.

The second transmission mode control information may alternatively be independent information. The second transmission mode control information includes the first identifier, and the second transmission mode associated with the first identifier. The second transmission mode may correspond to one or more first identifiers. Particularly, the second transmission mode may correspond to all the first identifiers. The terminal device may determine the second transmission mode control information based on an RRC message or broadcast message transmitted by the network device. The terminal device may alternatively determine the second transmission mode control information based on a preconfiguration.

It may be understood that, the terminal device does not perform the transmission control operation on second data on the second sidelink logical channel. To be specific, regardless of the load degree of the transmission channel, the terminal device uses a normal data transmission mode for the second data on the second sidelink logical channel. Specifically, the terminal device determines a third transmission configuration, and transmits the second data by using the third transmission configuration. The third transmission configuration includes at least one of a third modulation and coding scheme, a third transmit power, and a third quantity of retransmission times. The third transmission configuration is determined based on a transmission requirement of the second data, and is not affected by the load degree of the transmission channel. The terminal device may obtain the third transmission configuration based on an RRC message or a broadcast message transmitted by the network device, or may determine the third transmission configuration by itself.

In the method for data transmission according to this embodiment, the terminal device may perform transmission control on the first data (for example, data of lower importance) on the first sidelink logical channel, but does not perform transmission control on the second data (for example, data of higher importance) on the second sidelink logical channel. Therefore, transmission performance of the system in a high-density service scenario is improved, while transmission quality of important data is ensured.

Figure 4:
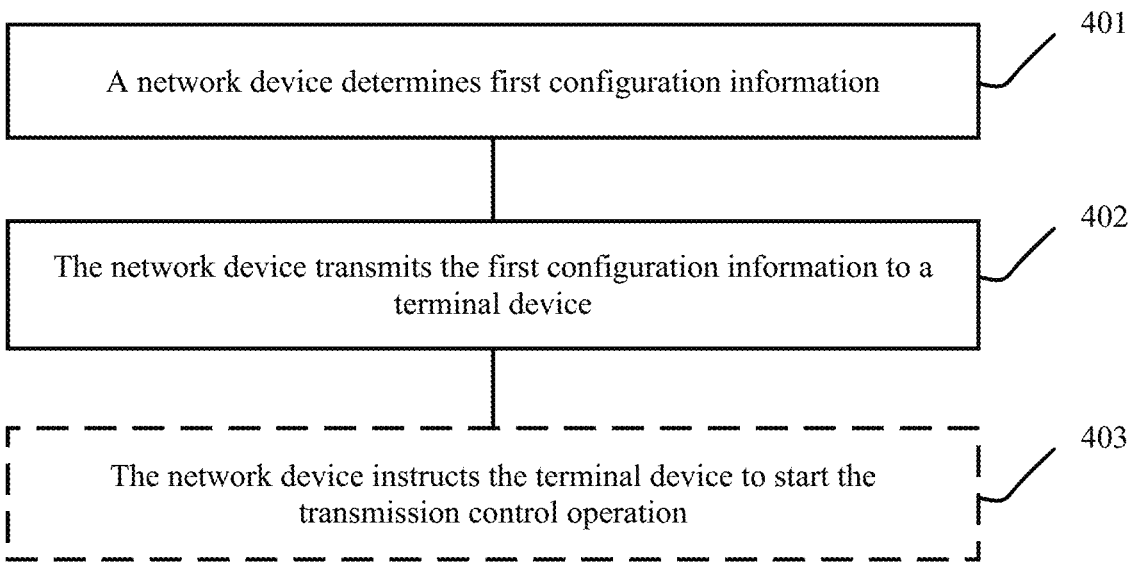
FIG. 4 is a flowchart of a method for data transmission in a wireless network according to another embodiment.

FIG. 4 is a flowchart of a method for data transmission in a wireless network according to another embodiment. The method provided by this embodiment is described in detail below with reference to FIG. 4.

S401. A network device determines first configuration information.

The first configuration information is used to determine at least one first sidelink logical channel, and the first sidelink logical channel is used to transmit direct communication data.

Optionally, content of the first configuration information and a manner of obtaining the first configuration information are the same as those described in steps S201 and S301 in the embodiments shown in FIG. 2 and FIG. 3. Details are not described again herein.

The first configuration information may further include the first limited power and the mapping relationship between the first limited power and the first identifier in step S202 in the embodiment shown in FIG. 2. The network device may alternatively transmit the first limited power and the mapping relationship between the first limited power and the first identifier as independent information to a terminal device.

The first configuration information may further include a maximum transmit power currently allowed by the terminal device, a third transmit power, and a fourth transmit power, as described in step S202 in the embodiment shown in FIG. 2.

S402. The network device transmits the first configuration information to a terminal device by using RRC message or a broadcast message.

Optionally, the network device may add the first configuration information to an RRC reconfiguration message and transmit the RRC reconfiguration message to the terminal device. Alternatively, the network device may add the first configuration information to another RRC dedicated message and transmit the another RRC reconfiguration message to the terminal device.

Optionally, the network device may further transmit a fourth identifier to the terminal device. The fourth identifier may be included in the first configuration information, or may be independent of the first configuration information. The fourth identifier and the first identifier may be identifiers of a same type. The terminal device receives the fourth identifier and compares a priority or an importance of the fourth identifier with that of the first identifier. The terminal device determines a sidelink logical channel corresponding to the first identifier whose priority or importance is higher than that of the fourth identifier, as the first sidelink logical channel.

Optionally, the method further includes step S403: The network device instructs the terminal device to start a transmission control operation.

In a possible implementation, the network device instructs, by transmitting the first configuration information to the terminal device, the terminal device to start the transmission control operation. Correspondingly, after receiving the first configuration information, the terminal device immediately starts the transmission control operation.

In another possible implementation, the network device determines, based on a load degree of a current transmission channel, to transmit first information. The first information is used to instruct the terminal device to start the transmission control operation. Specifically, the network device may receive, as described in step S302 in the embodiment shown in FIG. 3, a CBR reported by the terminal device or another terminal device, and determine to transmit the first information.

In still another possible implementation, the network device transmits second information to the terminal device. The second information is used to instruct the terminal device to start the transmission control operation. The network device may transmit the second information after determining that V2X service data and non-V2X service data are to be transmitted at a same time. For example, the network device transmits, to the terminal device, grant information of a transmission resource for transmitting the V2X service data and grant information of a transmission resource for transmitting the non-V2X service data. In two time-frequency resources indicated by the two types of grant information, when a part or all of one time-frequency resource and a part or all of the other time-frequency resource are in a same subframe, the network device transmits the second information.

Optionally, the second information is independent of the first configuration information. The second information may alternatively be included in the first configuration information. Alternatively, the second information includes the first configuration information.

Optionally, the method further includes: the network device transmits first transmission mode control information to the terminal device, where the first transmission mode control information is used to instruct the terminal device to transmit first data on the first sidelink logical channel in the first transmission mode, and the first transmission mode includes at least one of using a first transmission configuration, dropping data packets, or preferentially allocating a power.

The network device may further transmit second transmission mode control information to the terminal device, where content of the first transmission mode control information and the second transmission mode control information and manners of transmitting the first transmission mode control information and the second transmission mode control information are the same as those described in step S303 in the embodiment shown in FIG. 3. Details are not described again.

It may be understood that, a time sequence relationship between step S403 and step S402 is not particularly limited in this embodiment.

In the method for data transmission according to this embodiment, the network device may configure a logical channel supporting the transmission control operation for the terminal device, and therefore transmission performance of a system in a high-density service scenario is ensured.

The methods for data transmission in a wireless network according to the embodiments are described above from a perspective of interaction between network elements. It may be understood that, to implement the foregoing functions, the network elements, for example, a terminal device, an access network device, and a core network device, include corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the disclosure of illustrative examples of the present invention.

Figure 5:
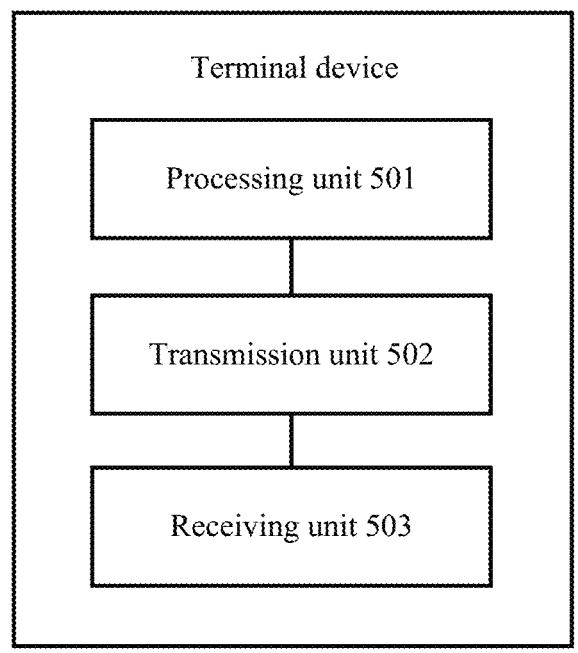
FIG. 5 is a possible schematic structural diagram of a terminal device according to an embodiment.

FIG. 5 is a possible schematic structural diagram of a terminal device used in the foregoing embodiment. The terminal device may be one of the terminal devices 20A to 20C shown in FIG. 1. The terminal device includes a processing unit 501, a transmission unit 502, and a receiving unit 503.

The processing unit 501 is configured to determine first configuration information, where the first configuration information is used to determine at least one first sidelink logical channel, and the first sidelink logical channel is used to transmit direct communication data.

If the processing unit 501 determines that type-1 data and type-2 data need to be transmitted at a same time, the processing unit 501 is further configured to allocate a first transmit power for first data based on the first configuration information, where the type-1 data and the type-2 data are data to be transmitted by using different transmission resources, and the first data is the type-1 data to be transmitted by using the first sidelink logical channel.

Optionally, the processing unit 501 determines the first configuration information based on an RRC message or a broadcast message received by the receiving unit 503. The processing unit 501 may alternatively determine the first configuration information based on a preconfiguration. Content and a form of the first configuration information may be the same as those described in step S201 in the embodiment shown in FIG. 2. Details are not described again herein.

The processing unit 501 may further determine, based on second information received by the receiving unit 503, to start a preferential power allocation operation.

The processing unit 501 may further determine, by using the method described in step S202 in the embodiment shown in FIG. 2, that the type-1 data and the type-2 data are to be transmitted at the same time. The processing unit 501 determines that a transmission resource used for the type-1 data and a transmission resource used for the type-2 data partly or completely overlap each other in time domain; or the processing unit 501 determines that a subframe for transmitting the type-1 data and a subframe for transmitting the type-2 data partly or completely overlap each other in time domain.

The processing unit 501 may determine the first sidelink logical channel based on a first identifier, as described in step S202 in the embodiment shown in FIG. 2. The first identifier is a priority identifier or a logical channel identifier. The processing unit 501 may also determine a second sidelink logical channel based on a second identifier, and further determine the first sidelink logical channel. The processing unit 501 may alternatively determine the first sidelink logical channel based on the first identifier and the second identifier. The foregoing corresponding content is not described again herein.

The processing unit 501 is further configured to determine the first sidelink logical channel based on a third identifier, as described in step S202 in the embodiment shown in FIG. 2.

The processing unit 501 may alternatively determine the first sidelink logical channel based on first indication information. For example, the processing unit 501 determines all sidelink logical channels as the first sidelink logical channels based on the first indication information.

The processing unit 501 is further configured to preferentially allocate a first transmit power for the first data, as described in step S202 in the embodiment shown in FIG. 2. The processing unit 501 is further configured to encapsulate the first data in a first PDU. The processing unit 501 is further configured to control the transmission unit 502 to transmit the first protocol data unit by using the first transmit power.

The processing unit 501 is further configured to allocate the first transmit power for the first data based on a first limited power, where the first transmit power is higher than the first limited power and lower than or equal to a maximum transmit power currently allowed by the terminal device.

The processing unit 501 allocates the first transmit power for the first data based on a first limited power, where the first transmit power is lower than or equal to the first limited power.

The processing unit 501 is further configured to add the first limited power to the first configuration information or a second message, or preconfigure the first limited power.

In this implementation, when there is an upper power limit in a system, the terminal device may preferentially allocate a transmit power for data on the first sidelink logical channel, to ensure transmission quality of the data and improve transmission performance of the system.

The processing unit 501 is further configured to encapsulate non-V2X service data in a second PDU, and determine a transmit power used for transmitting the second PDU.

The processing unit 501 is further configured to: if determining that V2X service data and non-V2X service data are not to be transmitted at a same time, determine the second transmit power for the V2X service data based on the currently allowed maximum transmit power, as described in step S202 in the embodiment shown in FIG. 2; or the processing unit 501 determines the second transmit power based on a current link loss between the terminal device and a network device. The processing unit 501 is further configured to control the transmission unit 502 to transmit the V2X service data by using the second transmit power.

The processing unit 501 is further configured to encapsulate second data on the second sidelink logical channel in the second PDU. The processing unit 501 is further configured to allocate a third transmit power for the non-V2X service data, and allocate a fourth transmit power for the second data.

The transmission unit 502 is further configured to transmit the first protocol data unit by using the first transmit power.

The transmission unit 502 is further configured to transmit the V2X service data by using the second transmit power.

Optionally, the receiving unit 503 is further configured to receive the first configuration information transmitted by the network device. The receiving unit 503 may obtain the first configuration information by receiving an RRC message or a broadcast message transmitted by the network device.

The receiving unit 503 is further configured to receive the third identifier transmitted by the network device. The third identifier may be included in the first configuration information, or may be independent of the first configuration information.

The receiving unit 503 is further configured to receive the first limited power and a mapping relationship between the first limited power and the first identifier that are transmitted by the network device. The receiving unit 503 is further configured to receive the maximum transmit power that is currently allowed to be used and that is transmitted by the network device.

For the foregoing units, other functions that may be implemented but are not described in detail are the same as related functions used in the method for data transmission shown in FIG. 2. Details are not described again herein. Based on collaboration between the foregoing units, transmission performance of the system in a high-density service scenario can be improved, while transmission quality of important data is ensured.

Functions of the foregoing units in the terminal device may be implemented by hardware or may be implemented by executing corresponding software by hardware. For example, each of the foregoing units may be hardware implementing a function of each module, or may be another hardware device that can execute a corresponding computer program to implement each of the foregoing functions.

Figure 6:
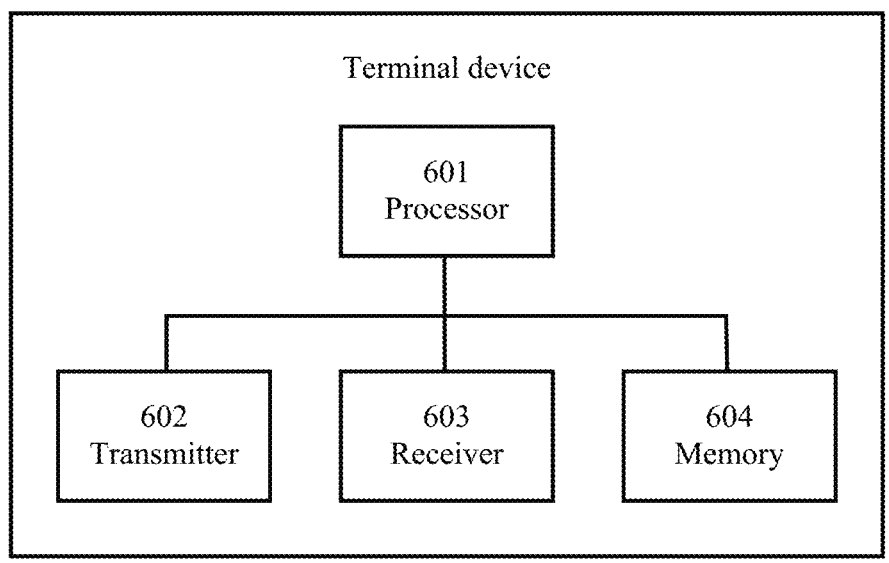
FIG. 6 is a possible schematic structural diagram of a terminal device according to another embodiment.

FIG. 6 is a possible schematic structural diagram of a terminal device used in the foregoing embodiment. The terminal device includes a processor 601, a transmitter 602, and a receiver 603. The processing unit 501 described in FIG. 5 may be implemented by the processor 601. The transmission unit 502 and the receiving unit 503 may be implemented by the transmitter 602 and the receiver 603. The transmitter 602 and the receiver 603 may be configured to support the terminal device in receiving or transmitting data from or to the network device in the foregoing embodiments. The terminal device may further include a memory 604, which may be configured to store program code and data of the terminal device. All components in the terminal device are coupled together to support various functions of the terminal device in the method for data transmission in the embodiment described in FIG. 2.

It may be understood that FIG. 6 shows only a simplified design of the terminal device. In an actual application, the terminal device may include any quantity of transmitters, receivers, processors, memories, and the like, and all terminal devices that can implement the present invention shall fall within the protection scope of the present invention.

Figure 7:
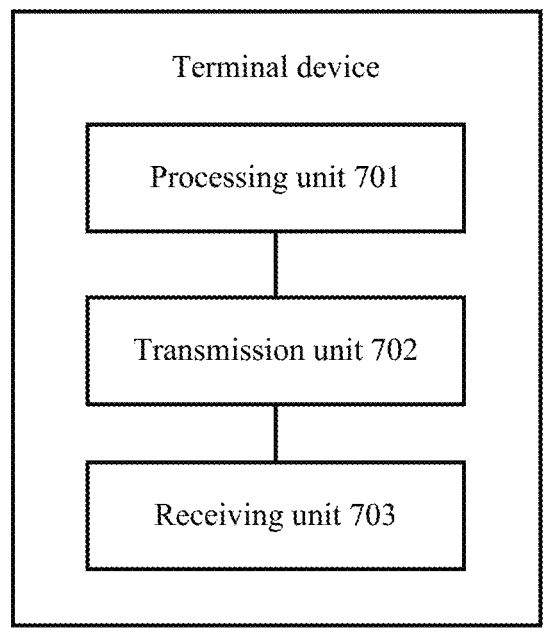
FIG. 7 is a possible schematic structural diagram of a terminal device according to an embodiment.

FIG. 7 is a possible schematic structural diagram of a terminal device used in the foregoing embodiment. The terminal device may be one of the terminal devices 20A to 20C shown in FIG. 1. The terminal device includes a processing unit 701, a transmission unit 702, and a receiving unit 703.

The processing unit 701 is configured to determine first configuration information, where the first configuration information is used to determine at least one first sidelink logical channel, and the first sidelink logical channel is used to transmit direct communication data.

The processing unit 701 is further configured to determine to start a transmission control operation.

The processing unit 701 is further configured to perform the transmission control operation on first data, where the first data is data that is in to-be-transmitted data and that is to be transmitted by using the first sidelink logical channel, and the transmission control operation includes: controlling, by the processing unit 701, the transmission unit 702 to transmit the first data in a first transmission mode.

Optionally, the processing unit 701 determines the first configuration information based on an RRC message or a broadcast message received by the receiving unit 703. The processing unit 701 may alternatively determine the first configuration information based on a preconfiguration. Content and a form of the first configuration information may be the same as those described in step S301 in the embodiment shown in FIG. 3. Details are not described again herein.

The processing unit 701 may be further configured to measure a CBR. When the CBR is greater than a preset threshold, the processing unit 701 determines to start the transmission control operation. The processing unit 701 may alternatively determine, based on first information received by the receiving unit 703, to start the transmission control operation. When determining the first configuration information, the processing unit 701 may further directly determine to start the transmission control operation.

The processing unit 701 may determine the first sidelink logical channel based on the first identifier, as described in step S303 in the embodiment shown in FIG. 3. The first identifier is a priority identifier or a logical channel identifier. The processing unit 701 may also determine second sidelink logical channel based on the second identifier, and further determine the first sidelink logical channel. The processing unit 701 may alternatively determine the first sidelink logical channel based on the first identifier and the second identifier. The foregoing corresponding content is not described again herein.

The processing unit 701 may alternatively determine the first sidelink logical channel based on first indication information. For example, the processing unit 701 determines all sidelink logical channels as the first sidelink logical channels based on the first indication information.

Optionally, the processing unit 701 is further configured to obtain first transmission mode control information before performing the transmission control operation. The processing unit 701 may determine the first transmission mode control information based on an RRC message or a broadcast message received by the receiving unit 703. The processing unit 701 may alternatively determine the first transmission mode control information based on a preconfiguration. Content and a form of the first transmission mode control information may be the same as those described in step S303 in the embodiment shown in FIG. 3. Details are not described again herein.

In a possible implementation, the processing unit 701 is further configured to determine a first transmission configuration. The processing unit 701 may determine the first transmission configuration based on the measured CBR, as described in step S30311 in the embodiment shown in FIG. 3. The processing unit 701 may alternatively determine the first transmission configuration based on a probability. The processing unit 701 may also determine, based on RRC dedicated signaling or system information received by the receiving unit 703, a plurality of transmission configurations and trigger probabilities corresponding to the plurality of transmission configurations. The processing unit 701 is further configured to encapsulate the first data in a first PDU. The processing unit 701 is further configured to determine an available transmission resource based on first grant information received by the receiving unit 703. The processing unit 701 is further configured to control the transmission unit 702 to transmit the first PDU by using the first transmission configuration.

In this implementation, when load of a transmission channel is relatively heavy, the terminal device may suppress data transmission on the first sidelink logical channel to improve transmission performance of a system.

In another possible implementation, the processing unit 701 is further configured to determine a drop probability of the first sidelink logical channel, as described in step S30321 in the embodiment shown in FIG. 3. The processing unit 701 is further configured to control the transmission unit 702 to drop the first data at a PDCP layer or a MAC layer.

In this implementation, when the load of the transmission channel is relatively heavy, the terminal device may drop some data of the first sidelink logical channel to improve transmission performance of the system.

Optionally, before the processing unit 701 determines to start the transmission control operation, the processing unit 701 is further configured to control the transmission unit 702 to transmit the first data on the first sidelink logical channel in a second transmission mode, as described in step S303 in the embodiment shown in FIG. 3. The processing unit 701 is further configured to determine second transmission mode control information. A manner of obtaining the second transmission mode control information and content and a form of the second transmission mode control information may be the same as those described in step S303 in the embodiment shown in FIG. 3. Details are not described again herein.

The processing unit 701 may be further configured to determine the second sidelink logical channel based on the first configuration information. The processing unit 701 controls the transmission unit 702 to transmit second data by using a third transmission configuration.

Optionally, the transmission unit 702 is further configured to transmit the CBR to a network device.

The transmission unit 702 is further configured to transmit the first data in the first transmission mode after the transmission control operation is started. Specifically, the transmission unit 702 transmits the first data by using the first transmission configuration. The transmission unit 702 may be further configured to transmit the first data in the second transmission mode before the transmission control operation is started. Specifically, the transmission unit 702 transmits the first data by using a second transmission configuration.

The transmission unit 702 is further configured to drop the first data.

The transmission unit 702 may be further configured to transmit the second data on the second sidelink logical channel in the second transmission mode. Specifically, the transmission unit 702 transmits the second data by using the third transmission configuration.

Optionally, the receiving unit 703 is further configured to receive the first configuration information transmitted by the network device. The receiving unit 703 may obtain the first configuration information by receiving an RRC message or a broadcast message transmitted by the network device.

The receiving unit 703 is further configured to receive the first information transmitted by the network device. The first information is used by the processing unit 701 to determine to start the transmission control operation, as described in the embodiment shown in FIG. 3.

The receiving unit 703 is further configured to receive the first transmission mode control information and/or the second transmission mode control information transmitted by the network device. The receiving unit 703 may obtain the first transmission mode control information and/or the second transmission mode control information by receiving an RRC message or a broadcast message transmitted by the network device.

The receiving unit 703 may be configured to receive a mapping relationship that is between the CBR and the first transmission configuration and that is transmitted by the network device. The receiving unit 703 may be further configured to receive the plurality of transmission configurations and the trigger probabilities corresponding to the plurality of transmission configurations that are transmitted by the network device.

The receiving unit 703 may be further configured to receive the drop probability that is of the first sidelink logical channel and that is transmitted by the network device.

For the foregoing units, other functions that may be implemented but are not described in detail are the same as related functions used in the method for data transmission shown in FIG. 3. Details are not described again herein. Based on collaboration between the foregoing units, transmission performance of the system in a high-density service scenario can be improved, while transmission quality of important data is ensured.

Functions of the foregoing units in the terminal device may be implemented by hardware or may be implemented by executing corresponding software by hardware. For example, each of the foregoing units may be hardware implementing a function of each module, or may be another hardware device that can execute a corresponding computer program to implement each of the foregoing functions.

Figure 8:
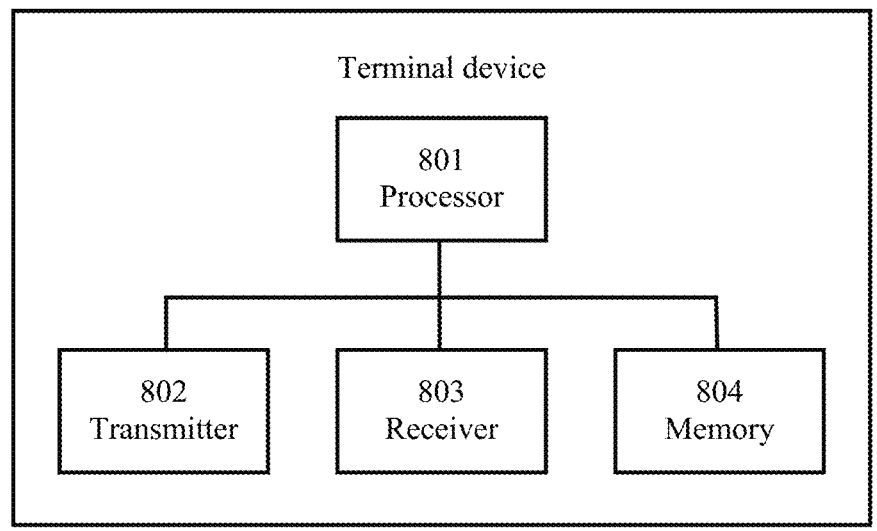
FIG. 8 is a possible schematic structural diagram of a terminal device according to another embodiment.

FIG. 8 is a possible schematic structural diagram of a terminal device used in the foregoing embodiment. The terminal device includes a processor 801, a transmitter 802, and a receiver 803. The processing unit 701 described in FIG. 7 may be implemented by the processor 801. The transmission unit 702 and the receiving unit 703 may be implemented by the transmitter 802 and the receiver 803. The transmitter 802 and the receiver 803 may be configured to support the terminal device in receiving or transmitting data from or to the network device in the foregoing embodiments. The terminal device may further include a memory 804, which may be configured to store program code and data of the terminal device. All components in the terminal device are coupled together to support various functions of the terminal device in the method for data transmission in the embodiment described in FIG. 3.

It may be understood that FIG. 8 shows only a simplified design of the terminal device. In an actual application, the terminal device may include any quantity of transmitters, receivers, processors, memories, and the like, and all terminal devices that can implement the present invention shall fall within the protection scope of the present invention.

Figure 9:
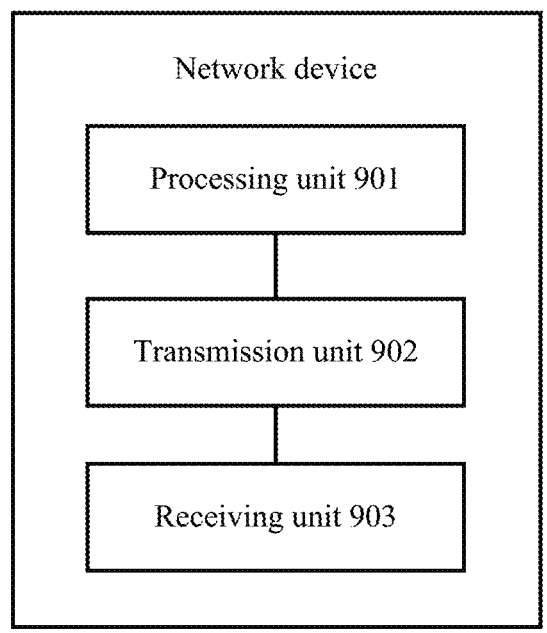
FIG. 9 is a possible schematic structural diagram of a network device according to an embodiment.

FIG. 9 is a possible schematic structural diagram of a network device used in the foregoing embodiment. The network device may be the network device 10 shown in FIG. 1. The network device includes a processing unit 901, a transmission unit 902, and a receiving unit 903.

The processing unit 901 is configured to determine first configuration information.

The first configuration information is used to determine at least one first sidelink logical channel. The first sidelink logical channel supports a transmission control operation. Content and a form of the first configuration information may be the same as those described in step S401 in the embodiment shown in FIG. 4. Details are not described again herein.

The transmission unit 902 is configured to transmit the first configuration information to a terminal device by using RRC message or a broadcast message.

Optionally, the transmission unit 902 is further configured to transmit a fourth identifier to the terminal device. The fourth identifier may be included in the first configuration information, or may be independent of the first configuration information.

The transmission unit 902 is further configured to transmit first information or second information to the terminal device, where the first information or the second information is used to instruct the terminal device to start the transmission control operation.

The transmission unit 902 may be configured to transmit first transmission mode control information to the terminal device, where the first transmission mode control information is used to instruct the terminal device to transmit first data on the first sidelink logical channel in a first transmission mode, and the first transmission mode includes using a first transmission configuration and/or dropping data packets. The transmission unit 902 may be further configured to transmit second transmission mode control information to the terminal device. The transmission unit 902 may transmit the first transmission mode control information and/or the second transmission mode control information by using an RRC message or a broadcast message. Content and forms of the first transmission mode control information and/or the second transmission mode control information may be the same as those described in step S403 in the embodiment shown in FIG. 4. Details are not described again herein.

The transmission unit 902 is further configured to transmit a first limited power, a mapping relationship between the first limited power and a first identifier, a maximum transmit power, a fifth transmit power, and a sixth transmit power to the terminal device, as described in the embodiment shown in FIG. 3.

Optionally, the receiving unit 903 is configured to receive a CBR transmitted by the terminal device. The CBR is used to indicate a load degree of a transmission channel.

For the foregoing units, other functions that may be implemented but are not described in detail are the same as related functions used in the method for data transmission shown in FIG. 4. Details are not described again herein. Based on collaboration between the foregoing units, the network device can configure a logical channel supporting the transmission control operation for the terminal device, and therefore transmission performance of a system in a high-density service scenario is ensured.

Functions of the foregoing units in the network device may be implemented by hardware or may be implemented by executing corresponding software by hardware. For example, each of the foregoing units may be hardware implementing a function of each module, or may be another hardware device that can execute a corresponding computer program to implement each of the foregoing functions.

Figure 10:
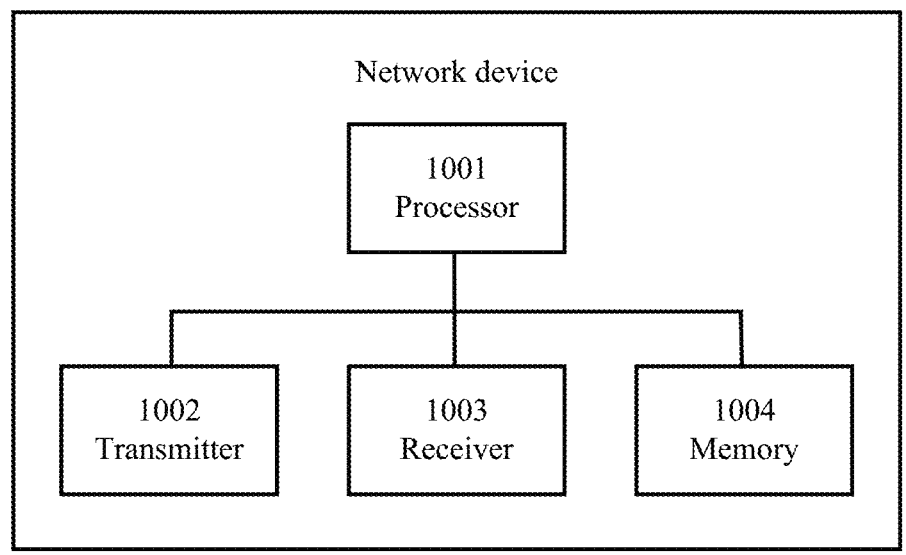
FIG. 10 is a possible schematic structural diagram of a network device according to another embodiment.

FIG. 10 is a possible schematic structural diagram of a network device used in the foregoing embodiment. The network device includes a processor 1001, a transmitter 1002, and a receiver 1003. The processing unit 901 described in FIG. 9 may be implemented by the processor 1001. The transmission unit 902 and the receiving unit 903 may be implemented by the transmitter 1002 and the receiver 1003. The transmitter 1002 and the receiver 1003 may be configured to support the network device in receiving or transmitting data from or to the terminal device in the foregoing embodiments. The network device may further include a memory 1004, which may be configured to store program code and data of the network device. All components in the network device are coupled together to support various functions of the network device in the method for data transmission in the embodiment described in FIG. 4.

It may be understood that FIG. 10 shows only a simplified design of the terminal device. In an actual application, the network device may include any quantity of transmitters, receivers, processors, memories, and the like, and all network devices that can implement the present invention shall fall within the protection scope of the present invention.

It may be understood that, the processor in this embodiment of the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor.

Steps of the methods or algorithms described in the embodiments may be directly embedded into hardware, a software module executed by a processing unit, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processing unit, so that the processing unit can decode information from the storage medium and can write information to the storage medium. Optionally, the storage medium may alternatively be integrated in the processing unit. The processing unit and the storage medium may be configured in the ASIC, and the ASIC may be configured in a terminal device. Optionally, the processing unit and the storage medium may also be configured in different components of the terminal device.

A person skilled in the art should be aware that in the foregoing one or more examples, the functions described in the embodiments may be implemented by hardware, software, firmware, or any combination thereof. If the functions are implemented by software, the functions may be stored on a computer-readable medium, or transmitted in a form of one or more instructions or code on a computer-readable medium. The computer-readable medium includes a computer storage medium and a communications medium that allows a computer program to be transferred from one place to another place. The storage medium may be an available medium that may be accessed by any general or special computer. For example, the computer-readable medium may include but is not limited to a RAM, a ROM, an EEPROM, a CD-ROM or another optical disc storage, a disk storage or another magnetic storage device, or any other medium that can be used to carry or store program code in a form of an instruction or a data structure and another form that can be decoded by a general or special computer or a general or special processing unit. In addition, any connection may be appropriately defined as a computer-readable medium. For example, if software is transmitted from a website, a server, or another remote resource by using a coaxial cable, an optical fiber, a twisted pair, a digital subscriber line (DSL) or in a wireless mode such as infrared, radio, or microwave, the transmission medium may also be included in the defined computer-readable medium. The disc (disc) and the disk (disk) include a compressed disk, a laser disc, an optical disc, a DVD, a floppy disk, and a Blu-ray disc. The disk generally copies data by a magnetic means, and the disc generally copies data optically by a laser means. The foregoing combination may also be included in the computer-readable medium.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method for a data transmission in a wireless network, the method comprising:
    first determining, by a terminal device, a first configuration information that is used for second determining at least one first sidelink logical channel that is used to transmit direct communication data;
    third determining, by the terminal device, that a type-1 data and a type-2 data need to be transmitted at a same time; and
    allocating, by the terminal device in response to the third determining, a first transmit power for a first data based on the first configuration information,
    wherein the type-1 data and the type-2 data are a service data of two distinct types that are to be transmitted by using distinct transmission resources, and the first data is the type-1 data to be transmitted by using the first sidelink logical channel,
    wherein the first configuration information comprises a first identifier taken from the group consisting of:
    a priority identifier, and
    a logical channel identifier;
    wherein the second determining comprises determining, by the terminal device as the at least one first sidelink logical channel:
    a sidelink logical channel having the first identifier;
    a sidelink logical channel not having the first identifier; or
    when at least one of sidelink logical channels associated with data encapsulated in a protocol data unit of the terminal device has the first identifier, all the sidelink logical channels associated with the data encapsulated in the protocol data unit, as the first sidelink logical channels;
    wherein the allocating comprises allocating the first transmit power for the first data based on a first limited power,
    wherein the first transmit power is:
    higher than the first limited power, and
    lower than or equal to a maximum transmit power currently allowed by the terminal device; and wherein the first limited power has a mapping relationship with the first identifier and indicates a maximum available transmit power for a data transmitted on a sidelink logical channel of the at least one first sidelink logical channel indicated by the first identifier.

2. The method according to claim 1, wherein the third determining comprises determining that:
   a transmission resource used for the type-1 data and a transmission resource used for the type-2 data at least partly overlap each other in a time domain; or
   a subframe for transmitting the type-1 data and a subframe for transmitting the type-2 data at least partly overlap each other in time domain.

3. The method according to claim 1, wherein the first configuration information comprises a first indication information that indicates at least some sidelink logical channels are the at least one first sidelink logical channel.

4. The method according to claim 1, wherein the first limited power is:
   carried in the first configuration information,
   carried in a second message, or
   preconfigured by the terminal device.

5. The method according to claim 1 further comprising:
   fourth determining, by the terminal device during a second data transmission, that the type-1 data and the type-2 data are not to be transmitted at the same time;
   fifth determining, by the terminal device in response to the fourth determining, a second transmit power for the type-1 data based on the currently allowed maximum transmit power, wherein the currently allowed maximum transmit power is:
      preconfigured by the terminal device, or
      determined by the terminal device based on configuration information transmitted by a network device; and
   transmitting, by the terminal device, the type-1 data by using the second transmit power.

6. The method according to claim 1, wherein the method further comprises:
   determining, by the terminal device, at least one second sidelink logical channel based on the first configuration information, wherein the second sidelink logical channel is used to transmit direct communication data;
   sixth determining that the type-1 data and the type-2 data need to be transmitted at the same time,
   allocating, by the terminal device in response to the sixth determining, a third transmit power for the type-2 data;
   allocating, by the terminal device, a fourth transmit power for a second data based on:
      the allowed maximum transmit power, and
      the third transmit power,
      wherein the second data is the type-1 data to be transmitted by using the second sidelink logical channel; and
   transmitting, by the terminal device, the second data by using the fourth transmit power.

7. A terminal device, comprising:
   a transmission unit,
   a processing unit, and
   a non-transitory computer-readable medium including computer-executable instructions that, when executed by the processing device, facilitate carrying out a data transmission in a wireless network, wherein the computer-executable instructions, when executed by the processing unit, facilitate the terminal device:

first determining a first configuration information that is used for second determining at least one first sidelink logical channel that is used to transmit direct communication data;
   third determining that a type-1 data and a type-2 data need to be transmitted at a same time; and
   allocating, in response to the third determining, a first transmit power for a first data based on the first configuration information,
   wherein the type-1 data and the type-2 data are a service data of two distinct types that are to be transmitted by using distinct transmission resources, and the first data is the type-1 data to be transmitted by using the first sidelink logical channel,
   wherein the first configuration information comprises a first identifier taken from the group consisting of:
      a priority identifier, and
      a logical channel identifier;
   wherein the second determining comprises determining, by the terminal device as the at least one first sidelink logical channel:
      a sidelink logical channel having the first identifier;
      a sidelink logical channel not having the first identifier; or
      when at least one of sidelink logical channels associated with data encapsulated in a protocol data unit of the terminal device has the first identifier, all the sidelink logical channels associated with the data encapsulated in the protocol data unit, as the first sidelink logical channels;
   wherein the allocating comprises allocating the first transmit power for the first data based on a first limited power,
   wherein the first transmit power is:
      higher than the first limited power, and
      lower than or equal to a maximum transmit power currently allowed by the terminal device; and
   wherein the first limited power has a mapping relationship with the first identifier and indicates a maximum available transmit power for a data transmitted on a sidelink logical channel of the at least one first sidelink logical channel indicated by the first identifier.

8. The terminal device according to claim 7, wherein the third determining comprises determining that:
   a transmission resource used for the type-1 data and a transmission resource used for the type-2 data at least partly overlap each other in a time domain; or
   a subframe for transmitting the type-1 data and a subframe for transmitting the type-2 data at least partly overlap each other in a time domain.

9. The terminal device according to claim 7, wherein the computer-executable instructions, when executed by the processing unit, further facilitate the terminal device:
   fourth determining, during a second data transmission, that the type-1 data and the type-2 data are not to be transmitted at the same time;
   fifth determining, in response to the fourth determining, a second transmit power for the type-1 data based on the currently allowed maximum transmit power, wherein the currently allowed maximum transmit power is:
      preconfigured by the processing unit, or
      determined by the processing unit based on configuration information transmitted by a network device; and
   transmitting, by the processing unit cooperatively operating with the transmission unit, the type-1 data by using the second transmit power.

10. The terminal device according to claim 7, wherein if the processing unit determines that the type-1 data and the type-2 data are not to be transmitted at the same time:
- the processing unit determines a second transmit power based on a current link loss between the terminal device and a network device; and
- the processing unit transmits the type-1 data by using the second transmit power.

\* \* \* \* \*